United States Patent
Sur

(10) Patent No.: US 12,261,534 B2
(45) Date of Patent: *Mar. 25, 2025

(54) QUASI-RESONANT FLYBACK CONVERTER FOR AN INDUCTION-BASED AEROSOL DELIVERY DEVICE

(71) Applicant: RAI Strategic Holdings, Inc., Winston-Salem, NC (US)

(72) Inventor: Rajesh Sur, Winston-Salem, NC (US)

(73) Assignee: RAI Strategic Holdings, Inc., Winston-Salem, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/453,858

(22) Filed: Aug. 22, 2023

(65) Prior Publication Data

US 2023/0396171 A1 Dec. 7, 2023

Related U.S. Application Data

(63) Continuation of application No. 17/582,916, filed on Jan. 24, 2022, now Pat. No. 11,764,687, which is a
(Continued)

(51) Int. Cl.
*H02M 3/335* (2006.01)
*A24F 40/10* (2020.01)
(Continued)

(52) U.S. Cl.
CPC .......... *H02M 3/3353* (2013.01); *A24F 40/46* (2020.01); *A24F 40/465* (2020.01); *A24F 40/50* (2020.01);
(Continued)

(58) Field of Classification Search
CPC ..... H02M 3/3353; A24F 40/46; A24F 40/465; A24F 40/50; A24F 40/57; A24F 40/10;
(Continued)

(56) References Cited

U.S. PATENT DOCUMENTS 1,514,682 A 11/1924 Wilson
1,771,366 A 7/1930 Wyss et al.
(Continued)

FOREIGN PATENT DOCUMENTS

AU 276250 A 7/1965
CA 2641869 A1 5/2010
(Continued)

OTHER PUBLICATIONS

Harper, J. "What a quasi-resonant converter does for you," EE Times, Sep. 3, 2007, 4pgs.
(Continued)

*Primary Examiner* — Lori L Baker
(74) *Attorney, Agent, or Firm* — Womble Bond Dickinson (US) LLP; Chris Humphrey; John V. Forcier

(57) ABSTRACT

An aerosol delivery device is provided that includes an aerosol precursor composition and a quasi-resonant flyback converter configured to cause components of the aerosol precursor composition to vaporize to produce an aerosol. The quasi-resonant flyback converter includes a transformer including an induction transmitter and an induction receiver, a capacitor that with the induction transmitter forms a tank circuit. The quasi-resonant flyback converter also includes a transistor that is switchable in cycles to cause the induction transmitter to generate an oscillating magnetic field and induce an alternating voltage in the induction receiver when exposed to the oscillating magnetic field, the alternating voltage causing the induction receiver to generate heat and thereby vaporize components of the aerosol precursor composition.

16 Claims, 14 Drawing Sheets

Related U.S. Application Data continuation of application No. 17/011,435, filed on Sep. 3, 2020, now Pat. No. 11,264,912, which is a continuation of application No. 15/836,086, filed on Dec. 8, 2017, now Pat. No. 10,806,181.

(51) Int. Cl.
   *A24F 40/20* (2020.01)
   *A24F 40/46* (2020.01)
   *A24F 40/465* (2020.01)
   *A24F 40/50* (2020.01)
   *A24F 40/57* (2020.01)

(52) U.S. Cl.
   CPC ............... *A24F 40/57* (2020.01); *A24F 40/10* (2020.01); *A24F 40/20* (2020.01)

(58) Field of Classification Search
   CPC ......... A24F 40/20; A24F 40/90; Y02B 70/10; H02J 7/0063; H05B 6/36
   USPC ..................... 131/300, 330; 219/660; 446/6
   See application file for complete search history.

(56) References Cited

U.S. PATENT DOCUMENTS

| | | |
|---|---|---|
| 2,057,353 A | 10/1936 | Whittemore, Jr. |
| 2,104,266 A | 1/1938 | McCormick |
| 3,200,819 A | 8/1965 | Gilbert |
| 3,479,561 A | 11/1969 | Janning |
| 4,284,089 A | 8/1981 | Ray |
| 4,303,083 A | 12/1981 | Burruss, Jr. |
| 4,466,770 A | 8/1984 | Peroutky |
| 4,639,368 A | 1/1987 | Niazi et al. |
| 4,735,217 A | 4/1988 | Gerth et al. |
| 4,848,374 A | 7/1989 | Chard et al. |
| 4,907,606 A | 3/1990 | Lilja et al. |
| 4,922,901 A | 5/1990 | Brooks et al. |
| 4,945,931 A | 8/1990 | Gori |
| 4,947,874 A | 8/1990 | Brooks et al. |
| 4,947,875 A | 8/1990 | Brooks et al. |
| 4,986,286 A | 1/1991 | Roberts et al. |
| 5,019,122 A | 5/1991 | Clearman et al. |
| 5,042,510 A | 8/1991 | Curtiss et al. |
| 5,060,671 A | 10/1991 | Counts et al. |
| 5,093,894 A | 3/1992 | Deevi et al. |
| 5,105,838 A | 4/1992 | White et al. |
| 5,144,962 A | 9/1992 | Counts et al. |
| 5,154,192 A | 10/1992 | Sprinkel et al. |
| 5,178,878 A | 1/1993 | Wehling et al. |
| 5,220,930 A | 6/1993 | Gentry |
| 5,223,264 A | 6/1993 | Wehling et al. |
| 5,249,586 A | 10/1993 | Morgan et al. |
| 5,261,424 A | 11/1993 | Sprinkel, Jr. |
| 5,271,419 A | 12/1993 | Arzonico et al. |
| 5,322,075 A | 6/1994 | Deevi et al. |
| 5,353,813 A | 10/1994 | Deevi et al. |
| 5,369,723 A | 11/1994 | Counts et al. |
| 5,372,148 A | 12/1994 | McCafferty et al. |
| 5,388,574 A | 2/1995 | Ingebrethsen |
| 5,388,594 A | 2/1995 | Counts et al. |
| 5,408,574 A | 4/1995 | Deevi et al. |
| 5,468,936 A | 11/1995 | Deevi et al. |
| 5,498,850 A | 3/1996 | Das |
| 5,515,842 A | 5/1996 | Ramseyer et al. |
| 5,530,225 A | 6/1996 | Hajaligol |
| 5,564,442 A | 10/1996 | MacDonald et al. |
| 5,649,554 A | 7/1997 | Sprinkel et al. |
| 5,666,977 A | 9/1997 | Higgins et al. |
| 5,687,746 A | 11/1997 | Rose et al. |
| 5,726,421 A | 3/1998 | Fleischhauer et al. |
| 5,727,571 A | 3/1998 | Meiring et al. |
| 5,743,251 A | 4/1998 | Howell et al. |
| 5,799,663 A | 9/1998 | Gross et al. |
| 5,819,756 A | 10/1998 | Mielordt |
| 5,865,185 A | 2/1999 | Collins et al. |
| 5,865,186 A | 2/1999 | Volsey, II |
| 5,878,752 A | 3/1999 | Adams et al. |
| 5,894,841 A | 4/1999 | Voges |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,125,853 A | 10/2000 | Susa et al. |
| 6,155,268 A | 12/2000 | Takeuchi |
| 6,164,287 A | 12/2000 | White |
| 6,196,218 B1 | 3/2001 | Voges |
| 6,196,219 B1 | 3/2001 | Hess et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,772,756 B2 | 8/2004 | Shayan |
| 6,803,545 B2 | 10/2004 | Blake et al. |
| 6,810,883 B2 | 11/2004 | Felter et al. |
| 6,854,461 B2 | 2/2005 | Nichols et al. |
| 6,854,470 B1 | 2/2005 | Pu |
| 6,908,874 B2 | 6/2005 | Woodhead et al. |
| 6,929,013 B2 | 8/2005 | Ashcraft et al. |
| 6,974,590 B2 | 12/2005 | Pather et al. |
| 7,040,314 B2 | 5/2006 | Nguyen et al. |
| 7,117,867 B2 | 10/2006 | Cox et al. |
| 7,195,019 B2 | 3/2007 | Hancock et al. |
| 7,275,548 B2 | 10/2007 | Hancock et al. |
| 7,276,120 B2 | 10/2007 | Holmes |
| 7,293,565 B2 | 11/2007 | Griffin et al. |
| 7,381,667 B2 | 6/2008 | Bergquist et al. |
| 7,513,253 B2 | 4/2009 | Kobayashi et al. |
| 7,726,320 B2 | 6/2010 | Robinson et al. |
| 7,775,459 B2 | 8/2010 | Martens, III et al. |
| 7,832,410 B2 | 11/2010 | Hon |
| 7,845,359 B2 | 12/2010 | Montaser |
| 7,896,006 B2 | 3/2011 | Hamano et al. |
| 8,127,772 B2 | 3/2012 | Montaser |
| 8,156,944 B2 | 4/2012 | Han |
| 8,205,622 B2 | 6/2012 | Pan |
| 8,314,591 B2 | 11/2012 | Terry et al. |
| 8,365,742 B2 | 2/2013 | Hon |
| 8,375,957 B2 | 2/2013 | Hon |
| 8,402,976 B2 | 3/2013 | Fernando et al. |
| 8,424,538 B2 | 4/2013 | Thomas et al. |
| 8,424,541 B2 | 4/2013 | Crawford et al. |
| 8,464,726 B2 | 6/2013 | Sebastian et al. |
| 8,499,766 B1 | 8/2013 | Newton |
| 8,528,569 B1 | 9/2013 | Newton |
| 8,550,069 B2 | 10/2013 | Alelov |
| 8,627,828 B2 | 1/2014 | Strickland et al. |
| 8,689,804 B2 | 4/2014 | Fernando et al. |
| 8,794,231 B2 | 8/2014 | Thorens et al. |
| 8,851,081 B2 | 10/2014 | Fernando et al. |
| 8,851,083 B2 | 10/2014 | Oglesby et al. |
| 8,881,737 B2 | 11/2014 | Collett et al. |
| 8,910,639 B2 | 12/2014 | Chang et al. |
| 8,915,254 B2 | 12/2014 | Monsees et al. |
| 8,925,555 B2 | 1/2015 | Monsees et al. |
| 9,220,302 B2 | 12/2015 | DePiano et al. |
| 9,254,002 B2 | 2/2016 | Chong et al. |
| 9,307,787 B2 | 4/2016 | Sun et al. |
| 9,423,152 B2 | 8/2016 | Ampolini et al. |
| 9,484,155 B2 | 11/2016 | Peckerar et al. |
| 10,517,332 B2 | 12/2019 | Sebastian et al. |
| 10,524,508 B2 | 1/2020 | Sur et al. |
| 10,806,181 B2 * | 10/2020 | Sur ..................... H02M 3/3353 |
| 10,820,630 B2 * | 11/2020 | Davis ..................... A24F 40/465 |
| 11,264,912 B2 * | 3/2022 | Sur ..................... A24F 40/465 |
| 2002/0146242 A1 | 10/2002 | Vieira |
| 2003/0226837 A1 | 12/2003 | Blake et al. |
| 2004/0118401 A1 | 6/2004 | Smith et al. |
| 2004/0129280 A1 | 7/2004 | Woodson et al. |
| 2004/0200488 A1 | 10/2004 | Felter et al. |
| 2004/0226568 A1 | 11/2004 | Takeuchi et al. |

(56) References Cited

U.S. PATENT DOCUMENTS

| | | |
|---|---|---|
| 2005/0016550 A1 | 1/2005 | Katase |
| 2006/0016453 A1 | 1/2006 | Kim |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0215167 A1 | 9/2007 | Llewellyn Crooks et al. |
| 2008/0085103 A1 | 4/2008 | Beland et al. |
| 2008/0092912 A1 | 4/2008 | Robinson et al. |
| 2008/0149118 A1 | 6/2008 | Oglesby et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0095311 A1 | 4/2009 | Han |
| 2009/0095312 A1 | 4/2009 | Herbrich et al. |
| 2009/0126745 A1 | 5/2009 | Hon |
| 2009/0188490 A1 | 7/2009 | Han |
| 2009/0230117 A1 | 9/2009 | Fernando et al. |
| 2009/0260641 A1 | 10/2009 | Monsees et al. |
| 2009/0260642 A1 | 10/2009 | Monsees et al. |
| 2009/0272379 A1 | 11/2009 | Thorens et al. |
| 2009/0283103 A1 | 11/2009 | Nielsen et al. |
| 2009/0320863 A1 | 12/2009 | Fernando et al. |
| 2010/0018539 A1 | 1/2010 | Brinkley et al. |
| 2010/0024834 A1 | 2/2010 | Oglesby et al. |
| 2010/0043259 A1 | 2/2010 | Janakiraman et al. |
| 2010/0043809 A1 | 2/2010 | Magnon |
| 2010/0083959 A1 | 4/2010 | Siller |
| 2010/0200006 A1 | 8/2010 | Robinson et al. |
| 2010/0229881 A1 | 9/2010 | Hearn |
| 2010/0242974 A1 | 9/2010 | Pan |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0094523 A1 | 4/2011 | Thorens et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0168194 A1 | 7/2011 | Hon |
| 2011/0265806 A1 | 11/2011 | Alarcon et al. |
| 2011/0309157 A1 | 12/2011 | Yang et al. |
| 2012/0042885 A1 | 2/2012 | Stone et al. |
| 2012/0055494 A1 | 3/2012 | Hunt et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0227752 A1 | 9/2012 | Alelov |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |
| 2013/0008457 A1 | 1/2013 | Zheng et al. |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0192619 A1 | 8/2013 | Tucker et al. |
| 2013/0255702 A1 | 10/2013 | Griffith, Jr. et al. |
| 2013/0306084 A1 | 11/2013 | Flick |
| 2013/0319439 A1 | 12/2013 | Gorelick et al. |
| 2013/0340750 A1 | 12/2013 | Thorens et al. |
| 2013/0340775 A1 | 12/2013 | Juster et al. |
| 2014/0000638 A1 | 1/2014 | Sebastian et al. |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0109921 A1 | 4/2014 | Chen |
| 2014/0157583 A1 | 6/2014 | Ward et al. |
| 2014/0209105 A1 | 7/2014 | Sears et al. |
| 2014/0253144 A1 | 9/2014 | Novak, III et al. |
| 2014/0261408 A1 | 9/2014 | DePiano et al. |
| 2014/0261486 A1 | 9/2014 | Potter et al. |
| 2014/0261487 A1 | 9/2014 | Chapman et al. |
| 2014/0261495 A1 | 9/2014 | Novak, III et al. |
| 2014/0270727 A1 | 9/2014 | Ampolini et al. |
| 2014/0270729 A1 | 9/2014 | DePiano et al. |
| 2014/0270730 A1 | 9/2014 | DePiano et al. |
| 2014/0345631 A1 | 11/2014 | Bowen et al. |
| 2015/0007838 A1 | 1/2015 | Fernando et al. |
| 2015/0020823 A1 | 1/2015 | Lipowicz et al. |
| 2015/0020830 A1 | 1/2015 | Koller |
| 2015/0053217 A1 | 2/2015 | Steingraber et al. |
| 2015/0083150 A1 | 3/2015 | Conner et al. |
| 2015/0157052 A1 | 6/2015 | Ademe et al. |
| 2015/0220232 A1 | 8/2015 | Smith et al. |
| 2015/0245659 A1 | 9/2015 | DePiano et al. |
| 2016/0037826 A1 | 2/2016 | Hearn et al. |
| 2017/0000188 A1 | 1/2017 | Nordskog et al. |
| 2017/0099877 A1 | 4/2017 | Worm et al. |
| 2017/0112191 A1 | 4/2017 | Sur et al. |
| 2017/0112196 A1 | 4/2017 | Sur et al. |
| 2017/0127722 A1 | 5/2017 | Davis et al. |
| 2017/0202266 A1 | 7/2017 | Sur |

FOREIGN PATENT DOCUMENTS

| | | |
|---|---|---|
| CN | 1541577 A | 11/2004 |
| CN | 2719043 Y | 8/2005 |
| CN | 200997909 Y | 1/2008 |
| CN | 101116542 A | 2/2008 |
| CN | 101176805 A | 5/2008 |
| CN | 201379072 Y | 1/2010 |
| CN | 202825572 U | 3/2013 |
| CN | 104029025 A | 9/2014 |
| CN | 204906749 U | 12/2015 |
| CN | 106211394 A | 12/2016 |
| CN | 107306459 A | 10/2017 |
| DE | 102006004484 A1 | 8/2007 |
| DE | 102006041042 A1 | 3/2008 |
| DE | 202009010400 U1 | 11/2009 |
| EP | 0295122 A2 | 12/1988 |
| EP | 0430566 A2 | 6/1991 |
| EP | 0452220 A1 | 10/1991 |
| EP | 0845220 A1 | 6/1998 |
| EP | 1618803 A1 | 1/2006 |
| EP | 2316286 A1 | 5/2011 |
| EP | 2759498 A1 | 7/2014 |
| GB | 2469850 A | 11/2010 |
| JP | S63-83290 U | 6/1988 |
| JP | H06121733 A | 5/1994 |
| JP | 2010005249 A | 1/2010 |
| JP | 2012204119 A | 10/2012 |
| WO | WO-1997006786 A1 | 2/1997 |
| WO | WO-1997048293 A1 | 12/1997 |
| WO | WO-2001008514 A1 | 2/2001 |
| WO | WO-2003034847 A1 | 5/2003 |
| WO | WO-2003043450 A1 | 5/2003 |
| WO | WO-2004043175 A1 | 5/2004 |
| WO | WO-2004080216 A1 | 9/2004 |
| WO | WO-2005099494 A1 | 10/2005 |
| WO | WO-2007078273 A1 | 7/2007 |
| WO | WO-2007131449 A1 | 11/2007 |
| WO | WO-2009105919 A1 | 9/2009 |
| WO | WO-2009155734 A1 | 12/2009 |
| WO | WO-2010003480 A1 | 1/2010 |
| WO | WO-2010045670 A1 | 4/2010 |
| WO | WO-2010073122 A1 | 7/2010 |
| WO | WO-2010091593 A1 | 8/2010 |
| WO | WO-2010118644 A1 | 10/2010 |
| WO | WO-2010140937 A1 | 12/2010 |
| WO | WO-2011010334 A1 | 1/2011 |
| WO | WO-2012072762 A1 | 6/2012 |
| WO | WO-2012100523 A1 | 8/2012 |
| WO | WO-2013089551 A1 | 6/2013 |
| WO | WO-2014007694 A1 | 1/2014 |

(56) References Cited

FOREIGN PATENT DOCUMENTS

WO    WO-2014182736 A1    11/2014
WO    WO-2017143515 A1    8/2017

OTHER PUBLICATIONS

International Search Report issued Mar. 14, 2019 in corresponding International Application No. PCT/IB2018/059369, filed Nov. 27, 2018.
Programmable System-on-Chip (PSoC), "PSoC Analog Coprocessor: CY8C4Axx Family Datasheet", Cypress, Nov. 11, 2016, 43pgs.

* cited by examiner

QUASI-RESONANT FLYBACK CONVERTER FOR AN INDUCTION-BASED AEROSOL DELIVERY DEVICE

CROSS REFERENCE TO RELATED APPLICATION

This application is a continuation of U.S. application Ser. No. 17/582,916, filed Jan. 24, 2022, which is a continuation of U.S. application Ser. No. 17/011,435, filed Sep. 3, 2020, which is a continuation of U.S. application Ser. No. 15/836,086, filed Dec. 8, 2017, the contents of which are herein incorporated by reference in their entireties.

TECHNOLOGICAL FIELD

The present disclosure relates to aerosol delivery devices such as electronic cigarettes and heat-not-burn cigarettes, and more particularly to an induction-based aerosol delivery device. The aerosol delivery device may be configured to heat an aerosol precursor composition, which may be made or derived from tobacco or otherwise incorporate tobacco, to form an inhalable substance for human consumption.

BACKGROUND

Many smoking articles have been proposed through the years as improvements upon, or alternatives to, smoking products based upon combusting tobacco. Exemplary alternatives have included devices wherein a solid or liquid fuel is combusted to transfer heat to tobacco or wherein a chemical reaction is used to provide such heat source. Examples include the smoking articles described in U.S. Pat. No. 9,078,473 to Worm et al., which is incorporated herein by reference.

The point of the improvements or alternatives to smoking articles typically has been to provide the sensations associated with cigarette, cigar, or pipe smoking, without delivering considerable quantities of incomplete combustion and pyrolysis products. To this end, there have been proposed numerous smoking products, flavor generators, and medicinal inhalers which utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference. Other representative cigarettes or smoking articles that have been described and, in some instances, been made commercially available include those described in U.S. Pat. No. 4,735,217 to Gerth et al.; U.S. Pat. Nos. 4,922,901, 4,947,874, and 4,947,875 to Brooks et al.; U.S. Pat. No. 5,060,671 to Counts et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano; U.S. Pat. No. 6,772,756 to Shayan; US Pat. Pub. No. 2009/0095311 to Hon; US Pat. Pub. Nos. 2006/0196518, 2009/0126745, and 2009/0188490 to Hon; US Pat. Pub. No. 2009/0272379 to Thorens et al.; US Pat. Pub. Nos. 2009/0260641 and 2009/0260642 to Monsees et al.; US Pat. Pub. Nos. 2008/0149118 and 2010/0024834 to Oglesby et al.; US Pat. Pub. No. 2010/0307518 to Wang; and WO 2010/091593 to Hon, which are incorporated herein by reference.

Representative products that resemble many of the attributes of traditional types of cigarettes, cigars or pipes have been marketed as ACCORD® by Philip Morris Incorporated; ALPHA™, JOVE 510™ and M4™ by InnoVapor LLC; CIRRUS™ and FLING™ by White Cloud Cigarettes; BLU™ by Lorillard Technologies, Inc.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGON-FLY™; EMIST™; EVERSMOKE™; GAMUCCI®; HYBRID FLAME™; KNIGHT STICKS™; ROYAL BLUES™; SMOKETIP®; SOUTH BEACH SMOKE™.

Articles that produce the taste and sensation of smoking by electrically heating tobacco or tobacco derived materials have suffered from inconsistent performance characteristics. Electrically heated smoking devices have further been limited in many instances by requiring large battery capabilities. Accordingly, it is desirable to provide a smoking article that can provide the sensations of cigarette, cigar, or pipe smoking, without substantial combustion, and that does so through induction heating.

BRIEF SUMMARY

The present disclosure relates to aerosol delivery devices configured to produce aerosol and which aerosol delivery devices, in some implementations, may be referred to as electronic cigarettes or heat-not-burn cigarettes. As described hereinafter, the aerosol delivery devices include a quasi-resonant flyback converter with a transformer including an induction transmitter and an induction receiver. The induction transmitter may include a coil configured to create an oscillating magnetic field (e.g., a magnetic field that varies periodically with time) when alternating current is directed therethrough. The induction receiver may be at least partially received within the induction transmitter and may include a conductive material. Thereby, by directing alternating current through the induction transmitter, eddy currents may be generated in the induction receiver via induction. The eddy currents flowing through the resistance of the material defining the induction receiver may heat it by Joule heating. Thereby, the induction receiver, which may define an atomizer, may be wirelessly heated to form an aerosol from an aerosol precursor composition positioned in proximity to the induction receiver. Wireless heating, as used herein, refers to heating that occurs via an atomizer that is not physically electrically connected to the (electrical) power source.

The present disclosure includes, without limitation, the following example implementations.

Some example implementations provide an aerosol delivery device comprising an aerosol precursor composition and a quasi-resonant flyback converter configured to cause components of the aerosol precursor composition to vaporize to produce an aerosol, the quasi-resonant flyback converter comprising a transformer including an induction transmitter and an induction receiver; a capacitor that with the induction transmitter forms a tank circuit; and a transistor that is switchable in cycles to cause the induction transmitter to generate an oscillating magnetic field and induce an alternating voltage in the induction receiver when exposed to the oscillating magnetic field, the alternating voltage causing the induction receiver to generate heat and thereby vaporize components of the aerosol precursor composition, wherein each of the cycles includes an on-interval in which the transistor is switched on to enable current through the induction transmitter that causes the induction transmitter to generate a magnetic field in which the induction transmitter stores energy, and an off-interval in which the transistor is switched off to disable current through the induction transmitter that causes a collapse of the magnetic field, and the collapse of the magnetic field causes a transfer of the energy from the induction transmitter to the induction receiver, and charges the capacitor and thereby causes a voltage waveform at a drain of the transistor, and wherein the quasi-resonant flyback converter further comprises a comparator with two input terminals coupled to either side of the capacitor between the capacitor and the drain of the transistor, the comparator being configured to detect a trough in the voltage waveform during the off-interval in which the transistor is switched off, and in response produce an output to cause the transistor to switch on for the on-interval.

In some example implementations of the aerosol delivery device of any preceding example implementation, or any combination of any preceding example implementations, the aerosol precursor composition includes a solid tobacco material, a semi-solid tobacco material or a liquid aerosol precursor composition.

In some example implementations of the aerosol delivery device of any preceding example implementation, or any combination of any preceding example implementations, the quasi-resonant flyback converter further comprises first and second voltage dividers whose inputs are coupled to either side of the capacitor, the two input terminals of the comparator being coupled to outputs of respective ones of the first and second voltage dividers and thereby coupled to either side of the capacitor.

In some example implementations of the aerosol delivery device of any preceding example implementation, or any combination of any preceding example implementations, the comparator is implemented by a coprocessor that is also configured to implement a pulse-width modulation (PWM) controller that is configured to receive the output from the comparator, and in response drive the transistor to switch on for the on-interval.

In some example implementations of the aerosol delivery device of any preceding example implementation, or any combination of any preceding example implementations, the coprocessor is further configured to implement a glitch filter coupled to and between the comparator and PWM controller, the glitch filter being configured to receive and remove glitch pulses from the output of the comparator and thereby produce a filtered output, and the PWM controller is configured to receive the filtered output, and in response drive the transistor to switch on for the on-interval.

In some example implementations of the aerosol delivery device of any preceding example implementation, or any combination of any preceding example implementations, the coprocessor is embodied as a programmable system-on-chip (PSoC).

In some example implementations of the aerosol delivery device of any preceding example implementation, or any combination of any preceding example implementations, the comparator is implemented by a coprocessor that is also configured to implement a glitch filter that is configured to receive and remove glitch pulses from the output of the comparator.

In some example implementations of the aerosol delivery device of any preceding example implementation, or any combination of any preceding example implementations, the coprocessor is embodied as a programmable system-on-chip (PSoC).

In some example implementations of the aerosol delivery device of any preceding example implementation, or any combination of any preceding example implementations, the comparator is implemented by a coprocessor that is embodied as a programmable system-on-chip (PSoC), and that is also configured to implement a pulse-width modulation (PWM) controller and a glitch filter coupled to and between the comparator and PWM controller, and wherein the glitch filter is configured to receive and remove glitch pulses from the output of the comparator and thereby produce a filtered output, and the PWM controller is configured to receive the filtered output, and in response drive the transistor to switch on for the on-interval.

In some example implementations of the aerosol delivery device of any preceding example implementation, or any combination of any preceding example implementations, the comparator is implemented by an individual electronic component or a circuit constructed of discrete electronic components.

In some example implementations of the aerosol delivery device of any preceding example implementation, or any combination of any preceding example implementations, the transistor has a drain-to-source on-state resistance ($R_{DS(on)}$) that is inversely proportional to a switching time of the transistor, and that is directly proportional to a time in which the alternating voltage is induced in the induction receiver and thereby the heat is generated.

voltage dividers whose inputs are coupled to either side of the capacitor, the two input terminals of the comparator being coupled to outputs of respective ones of the first and second voltage dividers and thereby coupled to either side of the capacitor.

In some example implementations of the control body of any preceding example implementation, or any combination of any preceding example implementations, the comparator is implemented by a coprocessor that is also configured to implement a pulse-width modulation (PWM) controller that is configured to receive the output from the comparator, and in response drive the transistor to switch on for the on-interval.

In some example implementations of the control body of any preceding example implementation, or any combination of any preceding example implementations, the comparator is implemented by a coprocessor that is also configured to implement a glitch filter that is configured to receive and remove glitch pulses from the output of the comparator.

In some example implementations of the control body of any preceding example implementation, or any combination of any preceding example implementations, the comparator is implemented by a coprocessor that is embodied as a programmable system-on-chip (PSoC), and that is also configured to implement a pulse-width modulation (PWM) controller and a glitch filter coupled to and between the comparator and PWM controller, and wherein the glitch filter is configured to receive and remove glitch pulses from the output of the comparator and thereby produce a filtered output, and the PWM controller is configured to receive the filtered output, and in response drive the transistor to switch on for the on-interval.

In some example implementations of the control body of any preceding example implementation, or any combination of any preceding example implementations, the comparator is implemented by an individual electronic component or a circuit constructed of discrete electronic components.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described the disclosure in the foregoing general terms, reference will now be made to the accompanying drawings, which are not necessarily drawn to scale, and wherein:

DETAILED DESCRIPTION

Figure 1:
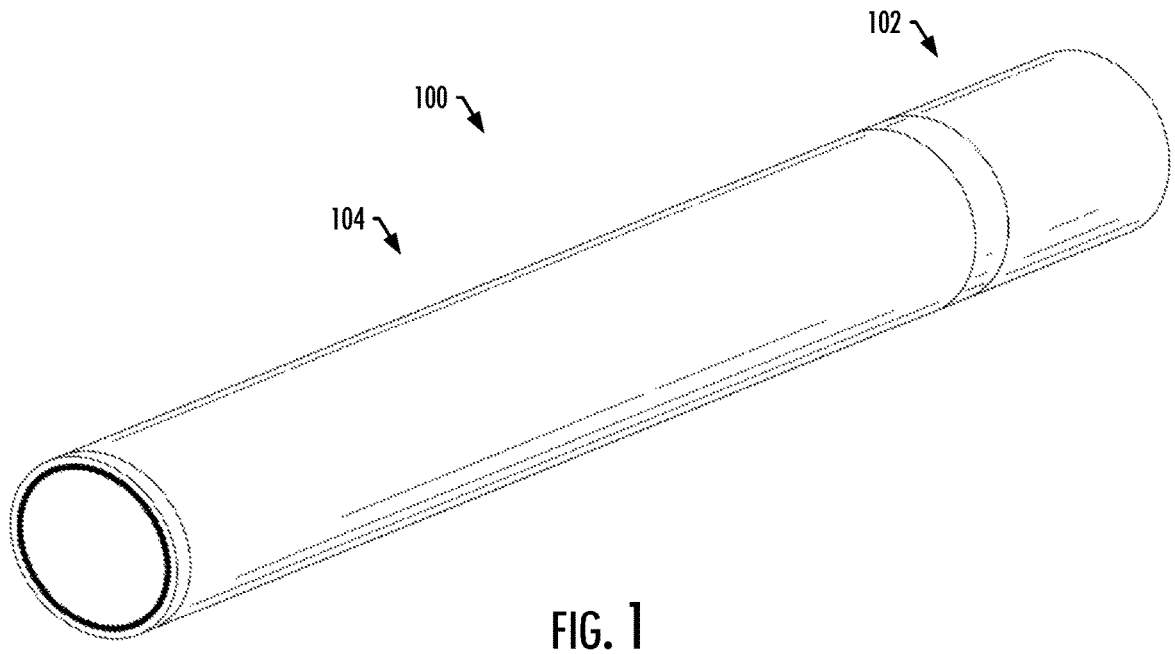
FIGS. 1 and 2 illustrate a perspective view of an aerosol delivery device comprising a cartridge and a control body that are respectively coupled to one another and decoupled from one another, according to an example implementation of the present disclosure.

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, example implementations of the present disclosure relate to aerosol delivery devices. Aerosol delivery devices according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery devices does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery devices may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery devices may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

While the systems are generally described herein in terms of implementations associated with aerosol delivery devices such as so-called "e-cigarettes," it should be understood that the mechanisms, components, features, and methods may be embodied in many different forms and associated with a variety of articles. For example, the description provided herein may be employed in conjunction with implementations of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of implementations relating to aerosol delivery devices by way of example only, and may be embodied and used in various other products and methods.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable battery and/or rechargeable supercapacitor, and various electronics for controlling the operation of that article), and at the other end and removably coupleable thereto, an outer body or shell containing a disposable portion (e.g., a disposable flavor-containing cartridge). More specific formats, configurations and arrangements of components within the single housing type of unit or within a multi-piece separable housing type of unit will be evident in light of the further disclosure provided herein. Additionally, various aerosol delivery device designs and component arrangements can be appreciated upon consideration of the commercially available electronic aerosol delivery devices.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow from the power source to other components of the aerosol delivery device), a heater (e.g., an electrical resistance or induction heater or component(s) commonly referred to as part of an "atomizer"), and an aerosol precursor composition (e.g., a solid tobacco material, a semi-solid tobacco material or a liquid aerosol precursor composition), and a mouth end region or tip for allowing draw upon the aerosol delivery device for aerosol inhalation (e.g., a defined airflow path through the article such that aerosol generated can be withdrawn therefrom upon draw).

Alignment of the components within the aerosol delivery device of the present disclosure can vary. In specific implementations, the aerosol precursor composition can be located near an end of the aerosol delivery device which may be configured to be positioned proximal to the mouth of a user so as to maximize aerosol delivery to the user. Other configurations, however, are not excluded. Generally, the heater may be positioned sufficiently near the aerosol precursor composition so that heat from the heater can volatilize the aerosol precursor (as well as one or more flavorants, medicaments, or the like that may likewise be provided for delivery to a user) and form an aerosol for delivery to the user. When the heater heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device may incorporate a battery or other power source to provide current flow sufficient to provide various functionalities to the aerosol delivery device, such as powering of a heater, powering of control systems, powering of indicators, and the like. The power source can take on various implementations. Preferably, the power source is able to deliver sufficient power to rapidly activate the heater to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices.

As described hereinafter, the present disclosure relates to aerosol delivery devices. Aerosol delivery devices may be configured to heat an aerosol precursor composition to produce an aerosol. The aerosol precursor composition may comprise one or more of a solid tobacco material, a semi-solid tobacco material, and a liquid aerosol precursor composition. In some implementations, the aerosol delivery devices may be configured to heat and produce an aerosol from a fluid aerosol precursor composition (e.g., a liquid aerosol precursor composition). Such aerosol delivery devices may include so-called electronic cigarettes.

Representative types of liquid aerosol precursor components and formulations are set forth and characterized in U.S. Pat. No. 7,726,320 to Robinson et al., U.S. Pat. No. 9,254,002 to Chong et al.; and U.S. Pat. App. Pub. Nos. 2013/0008457 to Zheng et al.; 2015/0020823 to Lipowicz et al.; and 2015/0020830 to Koller, as well as PCT Pat. App. Pub. No. WO 2014/182736 to Bowen et al.; and U.S. Pat. No. 8,881,737 to Collett et al., the disclosures of which are incorporated herein by reference. Other aerosol precursors that may be employed include the aerosol precursors that have been incorporated in any of a number of the representative products identified above. Also desirable are the so-called "smoke juices" for electronic cigarettes that have been available from Johnson Creek Enterprises LLC. Implementations of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; U.S. Pat. No. 7,381,667 to Bergquist et al.; U.S. Pat. No. 8,424,541 to Crawford et al; U.S. Pat. No. 8,627,828 to Strickland et al.; and U.S. Pat. No. 9,307,787 to Sun et al., as well as US Pat. App. Pub. Nos. 2010/0018539 to Brinkley et al.; and PCT Pat. App. Pub. No. WO 97/06786 to Johnson et al., all of which are incorporated by reference herein.

In other implementations, the aerosol delivery devices may comprise heat-not-burn devices, configured to heat a solid aerosol precursor composition (e.g., an extruded tobacco rod) or a semi-solid aerosol precursor composition (e.g., a glycerin-loaded tobacco paste). Representative types of solid and semi-solid aerosol precursor compositions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017/0000188 to Nordskog et al., all of which are incorporated by reference herein.

Regardless of the type of aerosol precursor composition heated, aerosol delivery devices may include a heater configured to heat the aerosol precursor composition. In some implementations, the heater is an induction heater. Such heaters often comprise an induction transmitter and an induction receiver. The induction transmitter may include a coil configured to create an oscillating magnetic field (e.g., a magnetic field that varies periodically with time) when alternating current is directed therethrough. The induction receiver may be at least partially received within the induction transmitter and may include a conductive material. By directing alternating current through the induction transmitter, eddy currents may be generated in the induction receiver via induction. The eddy currents flowing through the resistance of the material defining the induction receiver may heat it by Joule heating (i.e., through the Joule effect). The induction receiver, which may define an atomizer, may be wirelessly heated to form an aerosol from an aerosol precursor composition positioned in proximity to the induction receiver.

The amount of heat produced by the induction receiver may be proportional to the square of the electrical current times the electrical resistance of the material of the induction receiver. In implementations of the induction receiver comprising ferromagnetic materials, heat may also be generated by magnetic hysteresis losses. Several factors contribute to the temperature rise of the induction receiver including, but not limited to, proximity to the induction transmitter, distribution of the magnetic field, electrical resistivity of the material of the induction receiver, saturation flux density, skin effects or depth, hysteresis losses, magnetic susceptibility, magnetic permeability, and dipole moment of the material.

In this regard, both the induction transmitter and induction receiver may comprise an electrically conductive material. By way of example, the induction transmitter and/or the induction receiver may comprise various conductive materials including metals such as cooper and aluminum, alloys of conductive materials (e.g., diamagnetic, paramagnetic, or ferromagnetic materials) or other materials such as a ceramic or glass with one or more conductive materials imbedded therein. In another implementation, the induction receiver may comprise conductive particles. In some implementations, the induction receiver may be coated with or otherwise include a thermally conductive passivation layer (e.g., a thin layer of glass).

In some examples, the induction transmitter and the induction receiver may form an electrical transformer. In some examples, the transformer and associated circuitry including the PWM inverter may be configured to operate according to a suitable wireless power transfer standard such as the Qi interface standard developed by the Wireless Power Consortium (WPC), the Power Matters Alliance (PMA) interface standard developed by the PMA, the Rezence interface standard developed by the Alliance for Wireless Power (A4WP), and the like.

In some implementations aerosol delivery devices may include a control body and a cartridge in the case of so-called electronic cigarettes, or a control body and an aerosol source member in the case of heat-not-burn devices. In the case of either electronic cigarettes or heat-not-burn devices, the control body may be reusable, whereas the cartridge/aerosol source member may be configured for a limited number of uses and/or configured to be disposable. The cartridge/aerosol source member may include the aerosol precursor composition. In order to heat the aerosol precursor composition, the heater may be positioned proximate the aerosol precursor composition, such as across the control body and cartridge, or in the control body in which the aerosol source member may be positioned. The control body may include a power source, which may be rechargeable or replaceable, and thereby the control body may be reused with multiple cartridges/aerosol source members. The control body may also include a flow sensor to detect when a user draws on the cartridge/aerosol source member.

In more specific implementations, one or both of the control body and the cartridge/aerosol source member may be referred to as being disposable or as being reusable. For example, the control body may have a power source such as a replaceable battery or a rechargeable battery, solid-state battery, thin-film solid-state battery, rechargeable supercapacitor or the like, and thus may be combined with any type of recharging technology, including connection to a wall charger, connection to a car charger (i.e., cigarette lighter receptacle), and connection to a computer, such as through a universal serial bus (USB) cable or connector (e.g., USB 2.0, 3.0, 3.1, USB Type-C), connection to a photovoltaic cell (sometimes referred to as a solar cell) or solar panel of solar cells, or wireless radio frequency (RF) based charger. Further, in some implementations in the case of an electronic cigarette, the cartridge may comprise a single-use cartridge, as disclosed in U.S. Pat. No. 8,910,639 to Chang et al., which is incorporated herein by reference.

Examples of power sources are described in U.S. Pat. No. 9,484,155 to Peckerar et al., and U.S. Pat. App. Pub. No. 2017/0112191 to Sur et al., filed Oct. 21, 2015, the disclosures of which are incorporated herein by reference. With respect to the flow sensor, representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference. Reference also is made to the control schemes described in U.S. Pat. No. 9,423,152 to Ampolini et al., which is incorporated herein by reference.

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and PCT Pat. App. Pub. No. WO 2010/003480 by Flick discloses a fluid flow sensing system indicative of a puff in an aerosol generating system; all of the foregoing disclosures being incorporated herein by reference in their entireties.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference. Further, U.S. Pat. App. Pub. No. 2017/0099877 to Worm et al., discloses capsules that may be included in aerosol delivery devices and fob-shape configurations for aerosol delivery devices, and is incorporated herein by reference. A variety of the materials disclosed by the foregoing documents may be incorporated into the present devices in various implementations, and all of the foregoing disclosures are incorporated herein by reference in their entireties.

Figure 2:
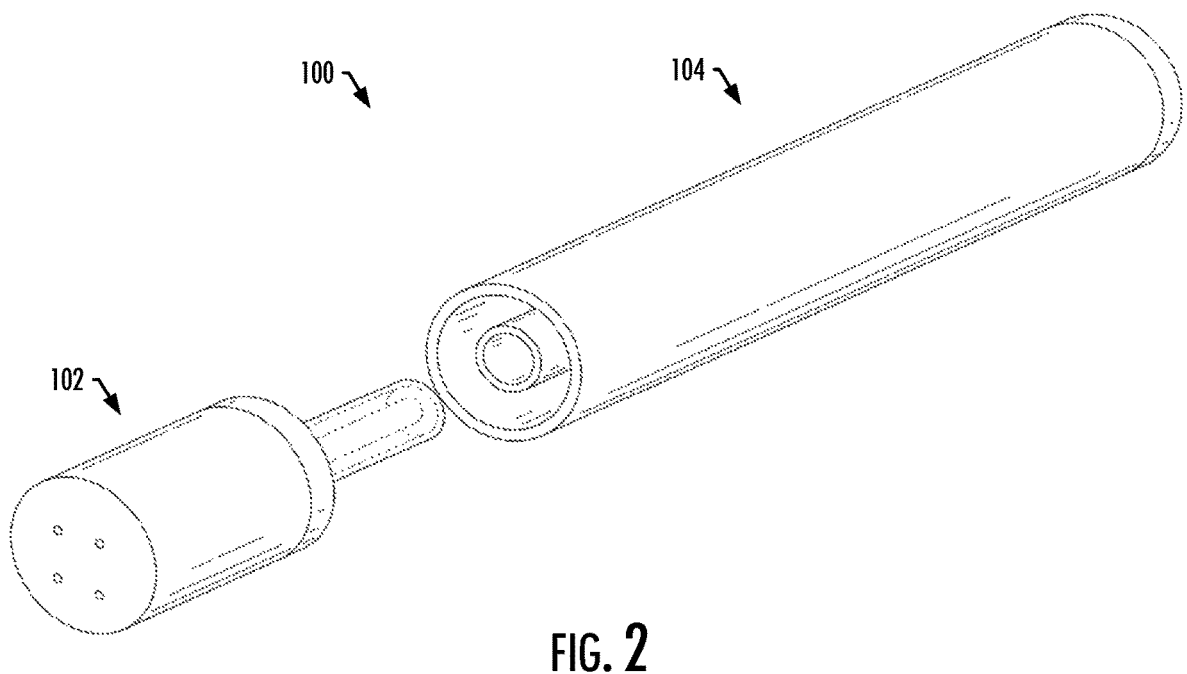

FIGS. 1-8 illustrate implementations of an aerosol delivery device including a control body and a cartridge in the case of an electronic cigarette. More specifically, FIG. 1 illustrates an aerosol delivery device 100 according to an example implementation of the present disclosure. As indicated, the aerosol delivery device may include a control body 102 and a cartridge 104. The control body and the cartridge can be permanently or detachably aligned in a functioning relationship. In this regard, FIG. 1 illustrates the aerosol delivery device in a coupled configuration, whereas FIG. 2 illustrates the aerosol delivery device in a decoupled configuration. Various mechanisms may connect the cartridge to the control body to result in a threaded engagement, a press-fit engagement, an interference fit, a magnetic engagement, or the like. The aerosol delivery device may be substantially rod-like, substantially tubular shaped, or substantially cylindrically shaped in some implementations when the control body and the cartridge are in an assembled configuration.

Figure 3:
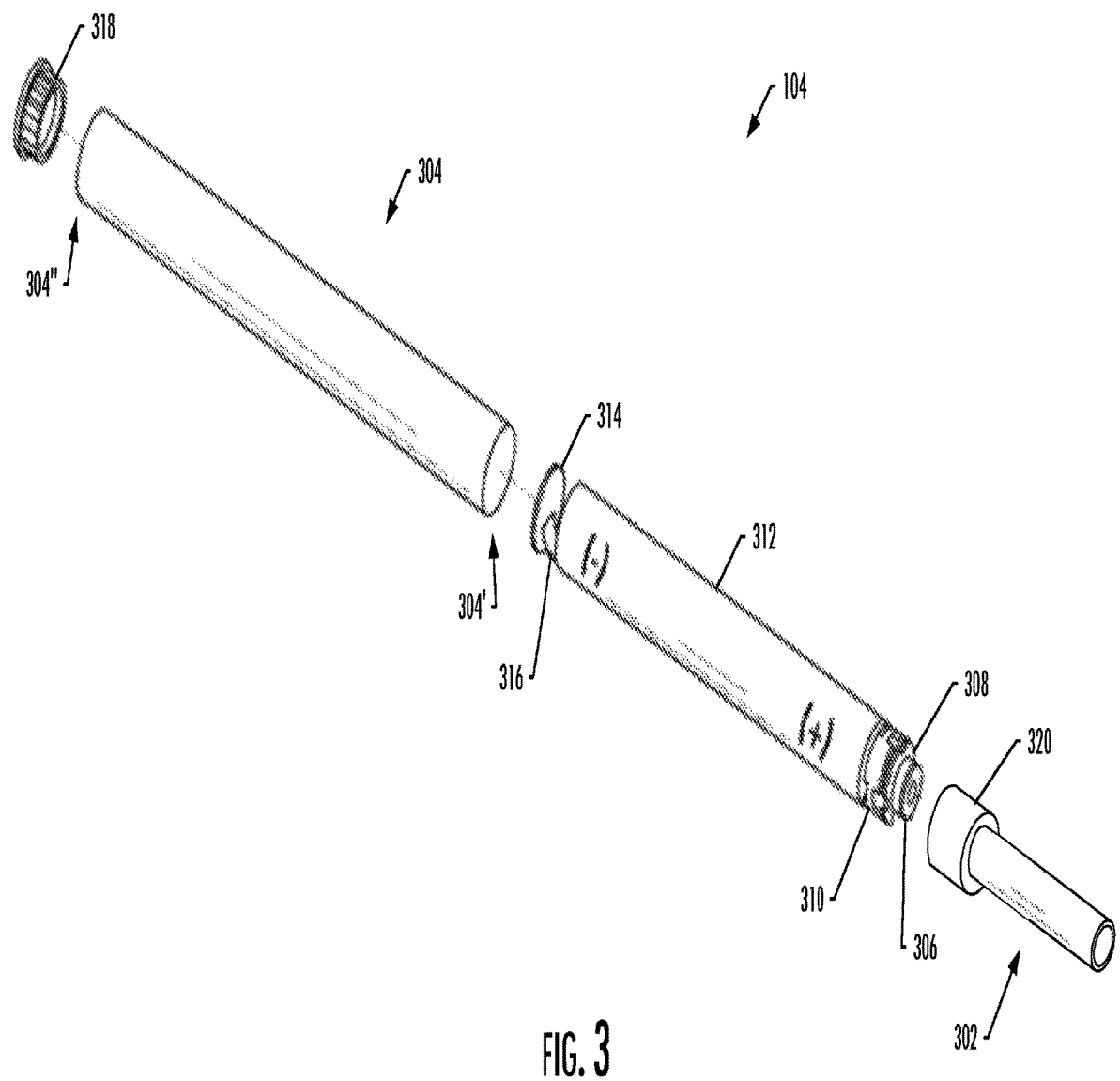
FIGS. 3 and 4 illustrate respectively an exploded view of and a sectional view through the control body of FIG. 1 in which an induction transmitter thereof defines a tubular configuration, according to an example implementation.

FIG. 3 illustrates an exploded view of the control body 102 of the aerosol delivery device 100 according to an example implementation of the present disclosure. As illustrated, the control body may comprise an induction transmitter 302, an outer body 304, a flow sensor 306 (e.g., a puff sensor or pressure switch), a control component 308 (e.g., a microprocessor, individually or as part of a microcontroller, a printed circuit board (PCB) that includes a microprocessor and/or microcontroller, etc.), a spacer 310, a power source 312 (e.g., a battery, which may be rechargeable, and/or a rechargeable supercapacitor), a circuit board with an indicator 314 (e.g., a light emitting diode (LED)), a connector circuit 316, and an end cap 318.

In one implementation, the indicator 314 may comprise one or more LEDs, quantum dot-based LEDs or the like. The indicator can be in communication with the control component 308 through the connector circuit 316 and be illuminated, for example, during a user drawing on a cartridge (e.g., cartridge 104 of FIG. 2) coupled to the control body 102, as detected by the flow sensor 306. The end cap 318 may be adapted to make visible the illumination provided thereunder by the indicator. Accordingly, the indicator may be illuminated during use of the aerosol delivery device 100 to simulate the lit end of a smoking article. However, in other implementations, the indicator can be provided in varying numbers and can take on different shapes and can even be an opening in the outer body (such as for release of sound when such indicators are present).

Each of the components of the control body 102 may be at least partially received in the outer body 304. The outer body may extend from an engagement end 304' to an outer end 304". The end cap 318 may be positioned at, and engaged with, the outer end of the outer body. Thereby, the end cap, which may be translucent or transparent, may be illuminated by the indicator 314 in order to simulate the lit end of a smoking article or perform other functions as described above. The opposing engagement end of the outer body may be configured to engage the cartridge 104.

Figure 4:
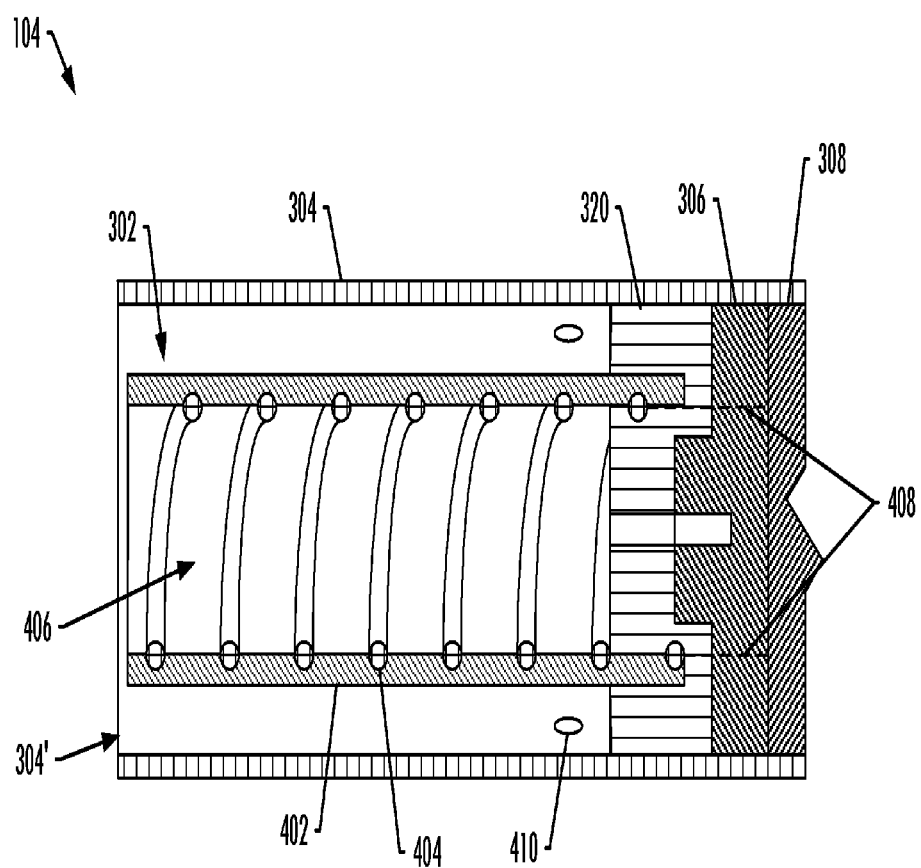

FIG. 4 schematically illustrates a partial sectional view through the control body 102 proximate the engagement end 304' of the outer body 304. As illustrated, the induction transmitter 302 may extend proximate the engagement end of the outer body. In one implementation, as illustrated in FIGS. 3 and 4, the induction transmitter may define a tubular configuration. As illustrated in FIG. 4, the induction transmitter may include a coil support 402 and a coil 404. The coil support, which may define a tubular configuration, may be configured to support the coil such that the coil does not move into contact with, and thereby short-circuit with, the induction receiver or other structures. The coil support may comprise a nonconductive material, which may be substantially transparent to the oscillating magnetic field produced by the coil. The coil may be imbedded in, or otherwise coupled to, the coil support. In the illustrated implementation, the coil is engaged with an inner surface of the coil support so as to reduce any losses associated with transmitting the oscillating magnetic field to the induction receiver. However, in other implementations, the coil may be positioned at an outer surface of the coil support or fully imbedded in the coil support. Further, in some implementations, the coil may comprise an electrical trace printed on or otherwise coupled to the coil support, or a wire. In either implementation, the coil may define a helical configuration.

Figure 5:
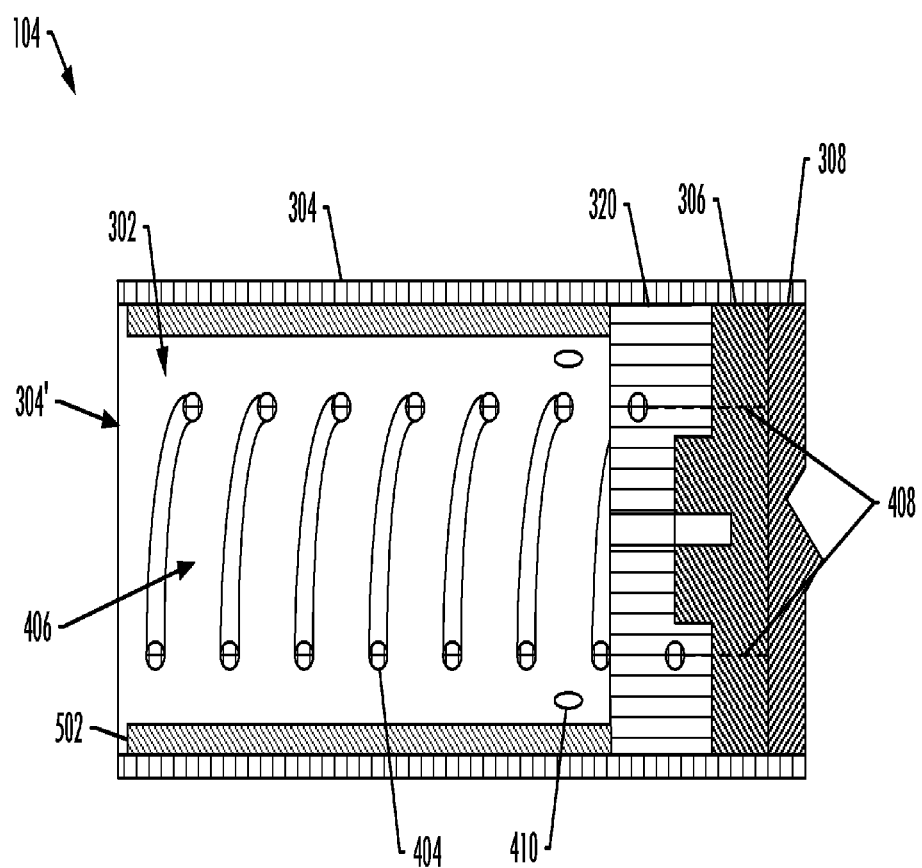
FIG. 5 illustrates a sectional view through the control body of FIG. 1 in which an induction transmitter thereof defines a coiled configuration, according to an example implementation.

In an alternate implementation, as illustrated in FIG. 5, the induction transmitter 302 may include the coil 404 without the coil support 402. In each implementation, the induction transmitter may define an inner chamber 406 about which the induction transmitter extends.

As further illustrated in FIGS. 3-5, in some implementations, the induction transmitter 302 may be coupled to a support member 320. The support member may be configured to engage the induction transmitter and support the induction transmitter within the outer body 304. For example, the induction transmitter may be imbedded in, or otherwise coupled to the support member, such that the induction transmitter is fixedly positioned within the outer body. By way of further example, the induction transmitter may be injection molded into the support member.

The support member 320 may engage an internal surface of the outer body 304 to provide for alignment of the support member with respect to the outer body. Thereby, as a result of the fixed coupling between the support member and the induction transmitter 302, a longitudinal axis of the induction transmitter may extend substantially parallel to a longitudinal axis of the outer body. Thus, the induction transmitter may be positioned out of contact with the outer body, so as to avoid transmitting current from the induction transmitter to the outer body. However, in some implementations, as shown in FIG. 5, an optional insulator 502 may be positioned between the induction transmitter 302 and the outer body 304, so as to prevent contact therebetween. As may be understood, the insulator and the support member may comprise any nonconductive material such as an insulating polymer (e.g., plastic or cellulose), glass, rubber, and porcelain. Alternatively, the induction transmitter may contact the outer body in implementations in which the outer body is formed from a nonconductive material such as a plastic, glass, rubber, or porcelain.

As described below in detail, the induction transmitter 302 may be configured to receive an electrical current from the power source 312 and wirelessly heat the cartridge 104 (see, e.g., FIG. 2). Thus, as illustrated in FIGS. 4 and 5, the induction transmitter may include electrical connectors 408 configured to supply the electrical current thereto. For example, the electrical connectors may connect the induction transmitter to the control component. Thereby, current from the power source may be selectively directed to the induction transmitter as controlled by the control component. For example, the control component 312 may direct current from the power source (see, e.g., FIG. 3) to the induction transmitter when a draw on the aerosol delivery device 100 is detected by the flow sensor 306. The electrical connectors may comprise, by way of example, terminals, wires, or any other implementation of connector configured to transmit electrical current therethrough. Further, the electrical connectors may include a negative electrical connector and a positive electrical connector.

In some implementations, the power source 312 may comprise a battery and/or a rechargeable supercapacitor, which may supply direct current. As described elsewhere herein, operation of the aerosol delivery device may require directing alternating current to the induction transmitter 302 to produce an oscillating magnetic field in order to induce eddy currents in the induction receiver. Accordingly, in some implementations, the control component 308 of the control body 102 may include an inverter or an inverter circuit configured to transform direct current provided by the power source to alternating current that is provided to the induction transmitter.

Figure 6:
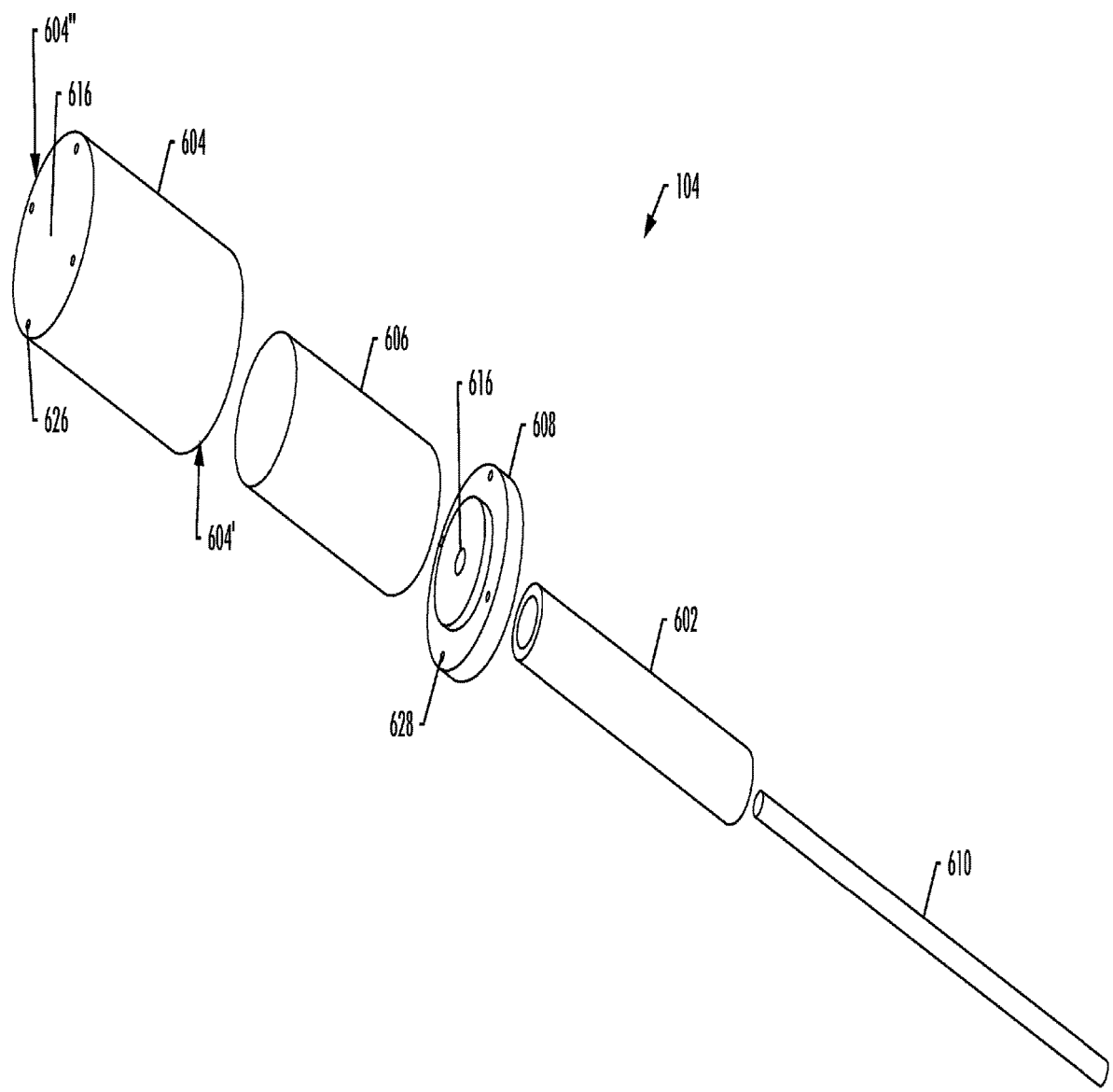
FIGS. 6 and 7 illustrate respectively an exploded view of and a sectional view through the cartridge of FIG. 1 in which a substrate thereof extends into an internal compartment defined by a container, according to an example implementation.

FIG. 6 illustrates an exploded view of the cartridge 600 that in some examples may correspond to the cartridge 104 of FIG. 1. As illustrated, the cartridge 600 may include an induction receiver 602, an outer body 604, a container 606, a sealing member 608, and a substrate 610 that may include an aerosol precursor composition. The outer body 604 may extend between an engagement end 604' and an outer end 604". Some or all of the remaining components of the cartridge 600 may be positioned at least partially within the outer body 604.

The cartridge 600 may additionally include a mouthpiece 612. The mouthpiece 612 may be integral with the outer body 604 or the container 606 or a separate component. The mouthpiece 612 may be positioned at the outer end 604" of the outer body 604.

Figure 7:
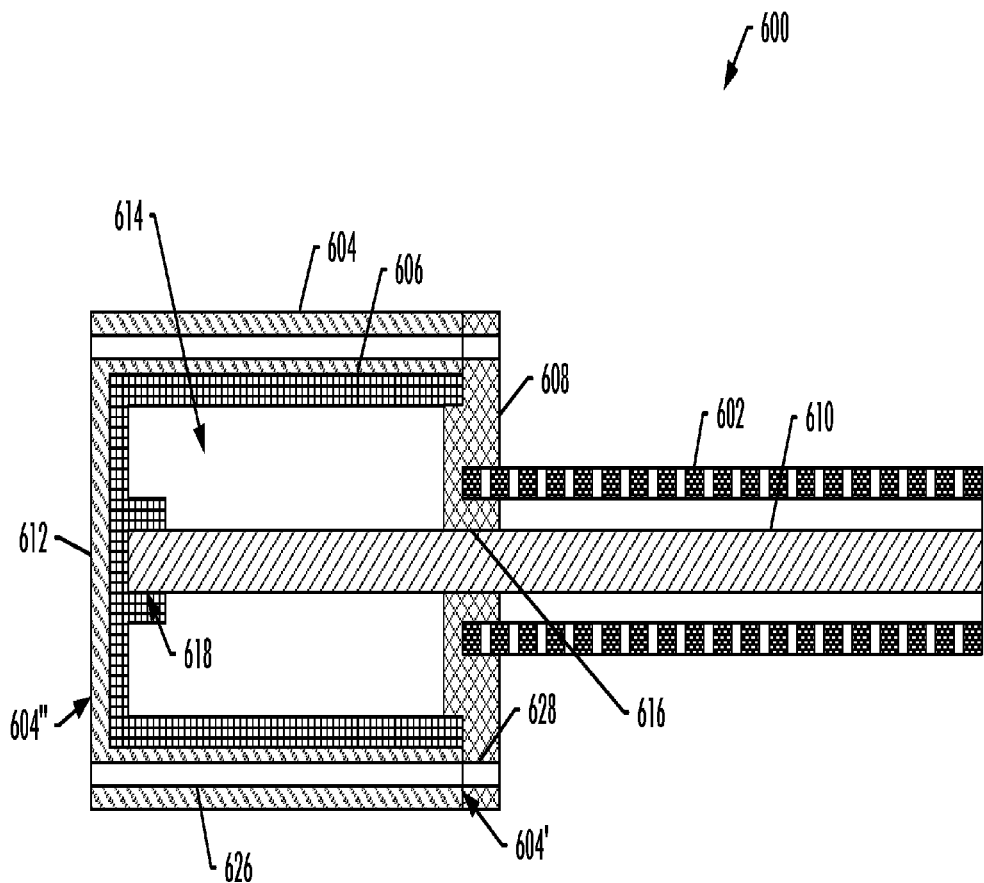

FIG. 7 illustrates a sectional view through the cartridge 600 in an assembled configuration. As illustrated, the container 606 may be received within the outer body 604. Further the sealing member 608 may be engaged with the container 606 to define an internal compartment 614. As further illustrated in FIG. 7, in some implementations, the sealing member 608 may additionally engage the outer body 604.

In some implementations, the sealing member 608 may comprise an elastic material such as a rubber or silicone material. In these implementations, the sealing material 608 may compress to form a tight seal with the container 606 and/or the outer body 604. An adhesive may be employed to further improve the seal between the sealing member 608 and the container 606 and/or the outer body 604. In another implementation, the sealing member 608 may comprise an inelastic material such as a plastic material or a metal material. In these implementations, the sealing member 608 may be adhered or welded (e.g., via ultrasonic welding) to the container 606 and/or the outer body 604. Accordingly, via one or more of these mechanisms, the sealing member 608 may substantially seal the internal compartment 614 shut.

The induction receiver 602 may be engaged with the sealing member 608. In one implementation, the induction receiver 602 may be partially imbedded in the sealing member 608. For example, the induction receiver 602 may be injection molded into the sealing member 608 such that a tight seal and connection is formed therebetween. Accordingly, the sealing member 608 may retain the induction receiver at a desired position. For example, the induction receiver 602 may be positioned such that a longitudinal axis of the induction receiver extends substantially coaxially with a longitudinal axis of the outer body 604.

Further, the substrate 610 may engage the sealing member 608. In one implementation, the substrate 610 may extend through the sealing member 608. In this regard, the sealing member 608 may define an aperture 616 extending therethrough, and through which the substrate 610 is received. Thereby, the substrate 610 may extend into the internal compartment 614. For example, as illustrated in FIG. 7, an end of the substrate 610 may be received in a pocket 618 defined by the container 606. Accordingly, the container 606 and the sealing member 608 may each engage the substrate 610 and cooperatively maintain the substrate at a desired position. For example, a longitudinal axis of the substrate 610 may be positioned substantially coaxial with a longitudinal axis of the induction receiver 602. Thereby, as illustrated, in some implementations, the substrate 610 may be positioned in proximity to, but out of contact with, the induction receiver 602. By avoiding direct contact between the substrate 610 and the induction receiver 602, the induction coil may remain substantially free of residue buildup from use, and hence the cartridge may optionally be refilled with aerosol precursor composition and/or a new substrate or otherwise reused. However, as discussed below, direct contact between the substrate and the induction receiver may be preferable in some implementations.

In implementations of the cartridge 104 wherein the aerosol precursor composition comprises a liquid or other fluid, the substrate 610 may be configured to retain the aerosol precursor composition therein and release a vapor therefrom when heat is applied thereto by the induction receiver 602 in the manner described below. In some implementations, the substrate 610 may retain a sufficient quantity of the aerosol precursor composition to last a desired extent. In other implementations it may be preferable to provide the cartridge 104 with an increased capacity of the aerosol precursor composition. Examples of materials that may be employed in the substrate 610 in implementations wherein the substrate is configured to hold a fluid aerosol precursor composition include a porous ceramic, carbon, cellulose acetate, polyethylene terephthalate, fiberglass, and porous sintered glass.

In this regard, as illustrated by way of example in FIGS. 6 and 7, in one implementation, the container 606 may comprise a reservoir and the internal compartment 614 may be configured to receive the liquid aerosol precursor composition. In this implementation, the substrate 610 may comprise a liquid transport element (e.g., a wick) configured to receive the aerosol precursor composition from the internal compartment 614 and transport the aerosol precursor composition therealong. Accordingly, the aerosol precursor composition may be transported from the internal compartment 614 to locations along the longitudinal length of the substrate 610 about which the induction receiver 602 extends.

As may be understood, the implementation of the cartridge 600 illustrated in FIG. 7 is provided for example purposes only. In this regard, various alternative implementations of cartridges 104 are provided herein by way of further example. Note that although the implementations of the cartridge are described separately herein, each of the respective components and features thereof may be combined in any manner except as may be otherwise noted herein. Other implementations of the aerosol delivery device, control body and cartridge are described in U.S. Pat. App. Pub. No. 2017/0127722 to Davis et al.; U.S. Pat. App. Pub. No. 2017/0202266 to Sur et al.; and U.S. patent application Ser. No. 15/352,153 to Sur et al., filed Nov. 15, 2016, all of which are incorporated by reference herein. Further, various examples of control components and functions performed thereby are described in U.S. Pat. App. Pub. No. 2014/0096782 to Sears et al., which is incorporated herein by reference.

Figure 8:
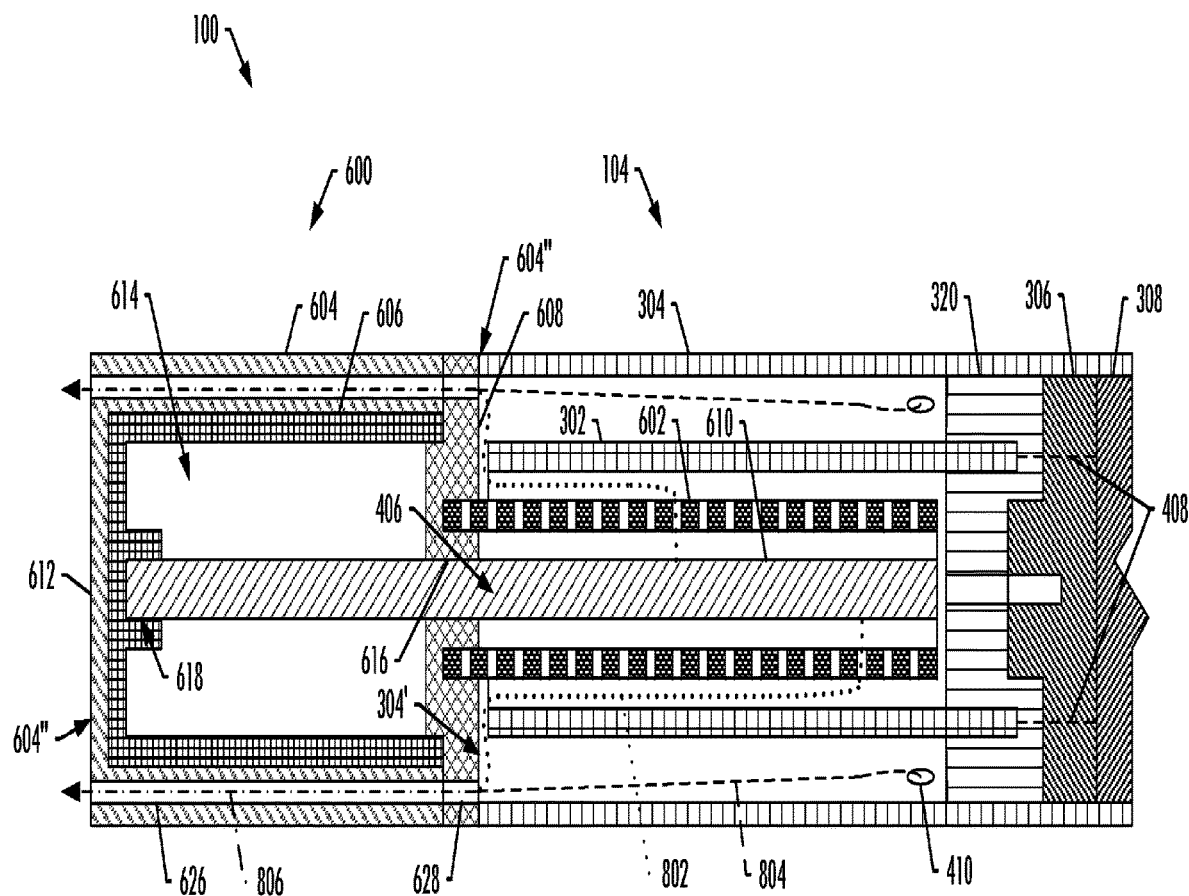
FIG. 8 illustrates a sectional view through the aerosol delivery device of FIG. 1 including the control body of FIG. 3 and the cartridge of FIG. 6, according to an example implementation.

As noted above, each of the cartridges 104 of the present disclosure is configured to operate in conjunction with the control body 102 to produce an aerosol. By way of example, FIG. 8 illustrates the cartridge 600 engaged with the control body. As illustrated, when the control body is engaged with the cartridge 600, the induction transmitter 302 may at least partially surround, preferably substantially surround, and more preferably fully surround the induction receiver 602 (e.g., by extending around the circumference thereof). Further, the induction transmitter 302 may extend along at least a portion of the longitudinal length of the induction receiver 602, and preferably extend along a majority of the longitudinal length of the induction receiver, and most preferably extend along substantially all of the longitudinal length of the induction receiver.

Accordingly, the induction receiver 602 may be positioned inside of the inner chamber 406 about which the induction transmitter 302 extends. Accordingly, when a user draws on the mouthpiece 612 of the cartridge 600, the pressure sensor 306 may detect the draw. Thereby, the control component 308 may direct current from the power source 312 (see, e.g., FIG. 3) to the induction transmitter 302. The induction transmitter 302 may thereby produce an oscillating magnetic field. As a result of the induction receiver 602 being received in the inner chamber 406, the induction receiver may be exposed to the oscillating magnetic field produced by the induction transmitter 302.

According to example implementations, a change in current in the induction transmitter 302, as directed thereto from the power source 312 (see, e.g., FIG. 3) by the control component 308, may produce an alternating electromagnetic field that penetrates the induction receiver 602, thereby generating electrical eddy currents within the induction receiver that heat the induction receiver through the Joule effect, as described above. The alternating electromagnetic field may be produced by directing alternating current to the induction transmitter 302. As noted above, in some implementations, the control component 308 may include an inverter or inverter circuit configured to transform direct current provided by the power source 312 to alternating current that is provided to the induction transmitter 302.

Accordingly, the induction receiver 602 may be heated. The heat produced by the induction receiver 602 may heat the substrate 610 including the aerosol precursor composition, such that an aerosol 802 is produced. Accordingly, the induction receiver 602 may comprise an atomizer. By positioning the induction receiver 602 around the substrate 610 at a substantially uniform distance therefrom (e.g., by aligning the longitudinal axes of the substrate and the induction receiver), the substrate and the aerosol precursor composition may be substantially uniformly heated.

The aerosol 802 may travel around or through the induction receiver 602 and the induction transmitter 302. For example, as illustrated, in one implementation, the induction receiver 602 may comprise a mesh, a screen, a helix, a braid, or other porous structure defining a plurality of apertures extending therethrough. In other implementations, the induction receiver may comprise a rod imbedded in a substrate or otherwise in contact with an aerosol precursor composition, a plurality of beads or particles imbedded in a substrate or otherwise in contact with an aerosol precursor composition, or a sintered structure. In each of these implementations, the aerosol 802 may freely pass through the induction receiver 602 and/or the substrate to allow the aerosol to travel through the mouthpiece to the user.

The aerosol 802 may mix with air 804 entering through inlets 410 (see, e.g., FIG. 4), which may be defined in the control body 102 (e.g., in the outer body 304). Accordingly, an intermixed air and aerosol 806 may be directed to the user. For example, the intermixed air and aerosol 806 may be directed to the user through one or more through holes 626 defined in the outer body 604 of the cartridge 600. In some implementations, the sealing member 608 may additionally include through holes 628 extending therethrough, which may align with the through holes 626 defined through the outer body 604. However, as may be understood, the flow pattern through the aerosol delivery device 100 may vary from the particular configuration described above in any of various manners without departing from the scope of the present disclosure.

Figure 9:
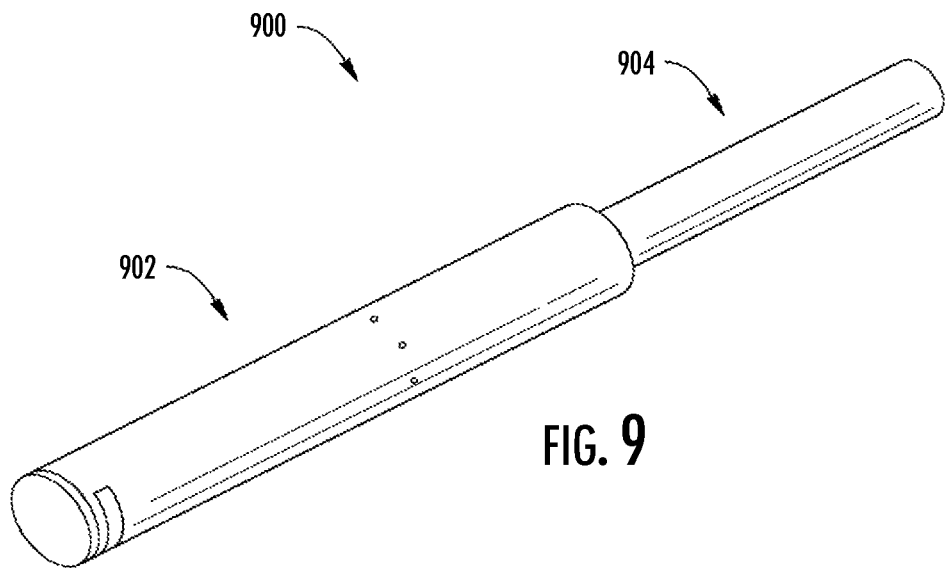
FIGS. 9 and 10 illustrate a perspective view of an aerosol delivery device comprising a control body and an aerosol source member that are respectively coupled to one another and decoupled from one another, according to another example implementation of the present disclosure.
Figure 10:
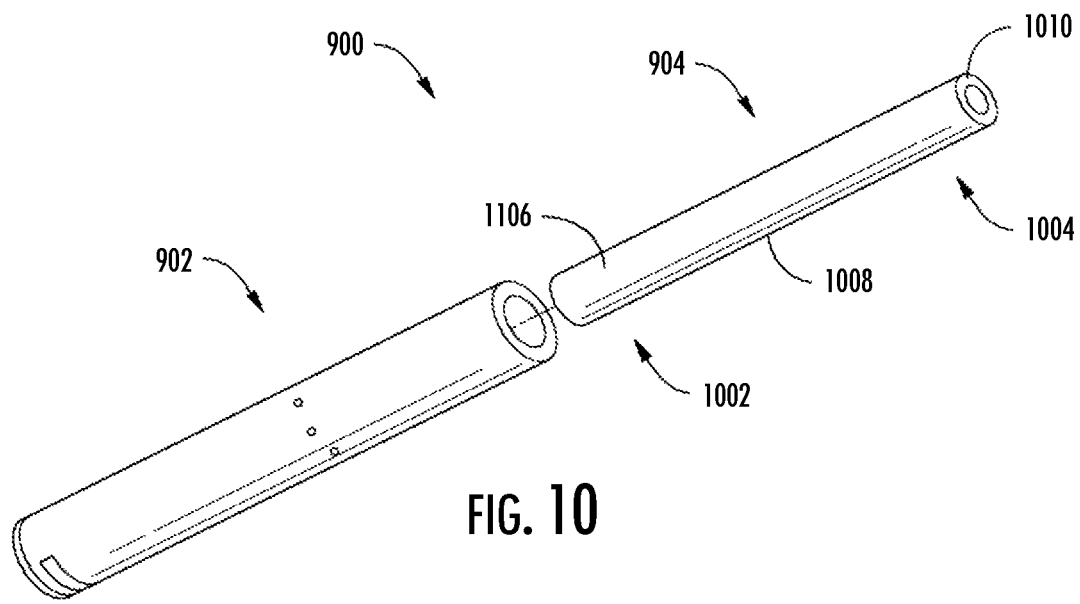

FIGS. 9-16 illustrate implementations of an aerosol delivery device including a control body and an aerosol source member in the case of a heat-not-burn device. More specifically, FIG. 9 illustrates an aerosol delivery device 900 according to an example implementation of the present disclosure. The aerosol delivery device may include a control body 902 and an aerosol source member 904. In various implementations, the aerosol source member and the control body can be permanently or detachably aligned in a functioning relationship. In this regard, FIG. 9 illustrates the aerosol delivery device in a coupled configuration, whereas FIG. 10 illustrates the aerosol delivery device in a decoupled configuration. Various mechanisms may connect the aerosol source member to the control body to result in a threaded engagement, a press-fit engagement, an interference fit, a sliding fit, a magnetic engagement, or the like. In various implementations, the control body of the aerosol delivery device may be substantially rod-like, substantially tubular shaped, or substantially cylindrically shaped (such as, for example, the implementations of the present disclosure shown in FIGS. 9-14). In other implementations, the control body may take another hand-held shape, such as a small box shape.

In various implementations of the present disclosure, the aerosol source member 904 may comprise a heated end 1002, which is configured to be inserted into the control body 902, and a mouth end 1004, upon which a user draws to create the aerosol. In various implementations, at least a portion of the heated end may include an aerosol precursor composition 1006 (sometimes referred to as an inhalable substance medium). The an aerosol precursor composition may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various embodiments, the aerosol source member, or a portion thereof, may be wrapped in an overwrap material 1008, which may be formed of any material useful for providing additional structure and/or support for the aerosol source member. In various implementations, the overwrap material may comprise a material that resists transfer of heat, which may include a paper or other fibrous material, such as a cellulose material. The overwrap material may also include at least one filler material imbedded or dispersed within the fibrous material. In various implementations, the filler material may have the form of water insoluble particles. Additionally, the filler material can incorporate inorganic components. In various implementations, the overwrap may be formed of multiple layers, such as an underlying, bulk layer and an overlying layer, such as a typical wrapping paper in a cigarette. Such materials may include, for example, lightweight "rag fibers" such as flax, hemp, sisal, rice straw, and/or esparto.

In various implementations, the mouth end of the aerosol source member 904 may include a filter 1010, which may be made of a cellulose acetate or polypropylene material. In various implementations, the filter may increase the structural integrity of the mouth end of the aerosol source member, and/or provide filtering capacity, if desired, and/or provide resistance to draw. For example, an article according to the invention can exhibit a pressure drop of about 50 to about 250 mm water pressure drop at 17.5 cc/second air flow. In further implementations, pressure drop can be about 60 mm to about 180 mm or about 70 mm to about 150 mm. Pressure drop value may be measured using a Filtrona Filter Test Station (CTS Series) available from Filtrona Instruments and Automation Ltd or a Quality Test Module (QTM) available from the Cerulean Division of Molins, PLC. The thickness of the filter along the length of the mouth end of the aerosol source member can vary—e.g., about 2 mm to about 20 mm, about 5 mm to about mm, or about 10 mm to about 15 mm. In some implementations, the filter may be separate from the overwrap, and the filter may be held in position by the overwrap.

Example types of overwrapping materials, wrapping material components, and treated wrapping materials that may be used in overwrap in the present disclosure are described in U.S. Pat. No. 5,105,838 to White et al.; U.S. Pat. No. 5,271,419 to Arzonico et al.; U.S. Pat. No. 5,220,930 to Gentry; U.S. Pat. No. 6,908,874 to Woodhead et al.; U.S. Pat. No. 6,929,013 to Ashcraft et al.; U.S. Pat. No. 7,195,019 to Hancock et al.; U.S. Pat. No. 7,276,120 to Holmes; U.S. Pat. No. 7,275,548 to Hancock et al.; PCT WO 01/08514 to Fournier et al.; and PCT WO 03/043450 to Hajaligol et al., which are incorporated herein by reference. Representative wrapping materials are commercially available as R. J. Reynolds Tobacco Company Grades 119, 170, 419, 453, 454, 456, 465, 466, 490, 525, 535, 557, 652, 664, 672, 676 and 680 from Schweitzer-Maudit International. The porosity of the wrapping material can vary, and frequently is between about 5 CORESTA units and about 30,000 CORESTA units, often is between about 10 CORESTA units and about 90 CORESTA units, and frequently is between about 8 CORESTA units and about 80 CORESTA units.

To maximize aerosol and flavor delivery which otherwise may be diluted by radial (i.e., outside) air infiltration through the overwrap 1008, one or more layers of non-porous cigarette paper may be used to envelop the aerosol source member 904 (with or without the overwrap present). Examples of suitable non-porous cigarette papers are commercially available from Kimberly-Clark Corp. as KC-63-5, P878-5, P878-16-2 and 780-63-5. Preferably, the overwrap is a material that is substantially impermeable to the vapor formed during use of the inventive article. If desired, the overwrap can comprise a resilient paperboard material, foil-lined paperboard, metal, polymeric materials, or the like, and this material can be circumscribed by a cigarette paper wrap. The overwrap may comprise a tipping paper that circumscribes the component and optionally may be used to attach a filter material to the aerosol source member, as otherwise described herein.

In various implementations other components may exist between the an aerosol precursor composition 1006 and the mouth end 1004 of the aerosol source member 904, wherein the mouth end may include a filter. For example, in some implementations one or any combination of the following may be positioned between the an aerosol precursor composition and the mouth end: an air gap; phase change materials for cooling air; flavor releasing media; ion exchange fibers capable of selective chemical adsorption; aerogel particles as filter medium; and other suitable materials.

Various implementations of the present disclosure employ an induction heater to heat the aerosol precursor composition 1006. The induction heater may comprise a transformer, which may comprise an induction transmitter and an induction receiver. In various implementations, one or both of the induction transmitter and induction receiver may be located in the control body and/or the aerosol source member. In some instances, the an aerosol precursor composition may include a plurality of beads or particles imbedded in, or otherwise part of, the aerosol precursor composition that may serve as, or facilitate the function of, an induction receiver.

Figure 11:
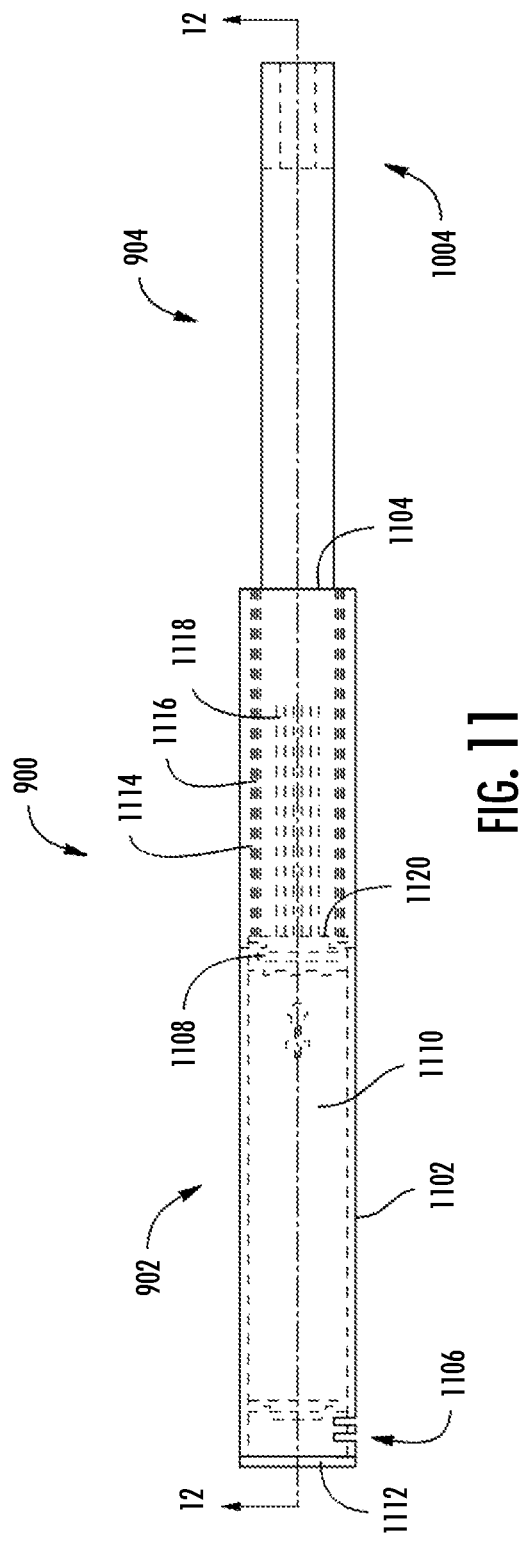
FIGS. 11 and 12 illustrate respectively a front view of and a sectional view through an aerosol delivery device according to an example implementation.
Figure 12:
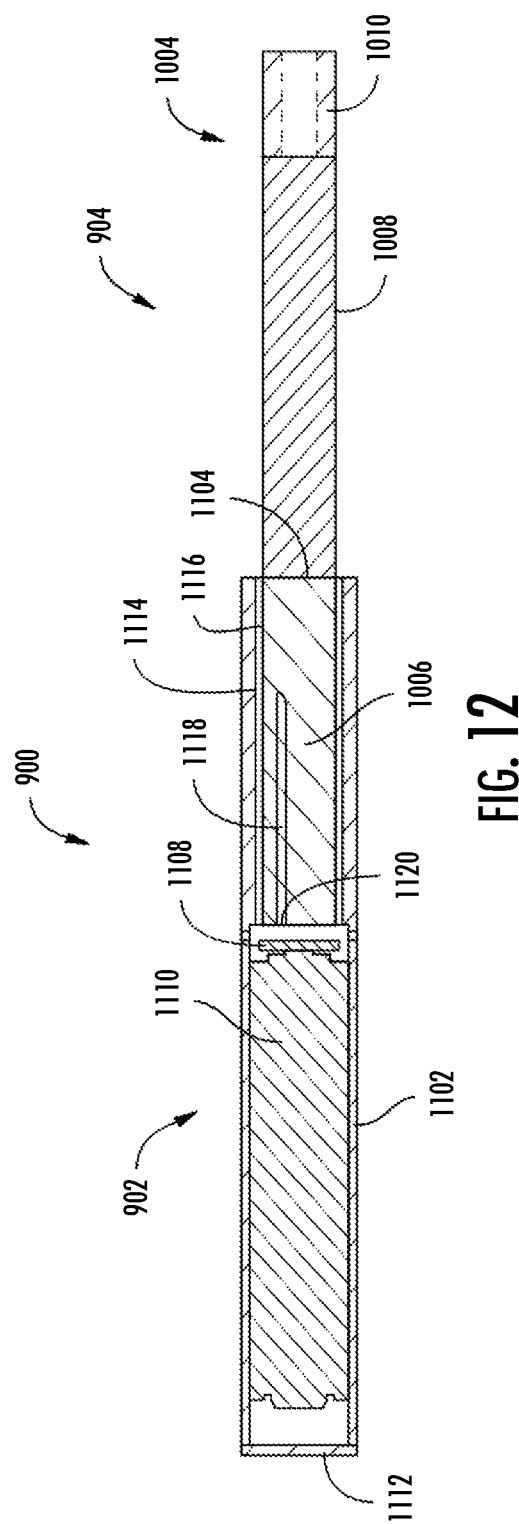

FIG. 11 illustrates a front view of an aerosol delivery device 900 according to an example implementation of the present disclosure, and FIG. 12 illustrates a sectional view through the aerosol delivery device of FIG. 11. As illustrated in these figures, the aerosol delivery device of this example implementation includes a transformer comprising an induction transmitter and an induction receiver. In particular, the control body 902 of the depicted implementation may comprise a housing 1102 that includes an opening 1104 defined in an engaging end thereof, a flow sensor 1106 (e.g., a puff sensor or pressure switch), a control component 1108 (e.g., a microprocessor, individually or as part of a microcontroller, a PCB that includes a microprocessor and/or microcontroller, etc.), a power source 1110 (e.g., a battery, which may be rechargeable, and/or a rechargeable supercapacitor), and an end cap that includes an indicator 1112 (e.g., a LED).

In one implementation, the indicator 1112 may comprise one or more LEDs, quantum dot-based LEDs or the like. The indicator can be in communication with the control component 1108 and be illuminated, for example, when a user draws on the aerosol source member 904, when coupled to the control body 902, as detected by the flow sensor 1106.

The control body 902 of the implementation depicted in FIGS. 11 and 12 includes an induction transmitter and an induction receiver that together form the transformer. The transformer of various implementations of the present disclosure may take a variety of forms, including implementations where one or both of the induction transmitter and induction receiver are located in the control body or the aerosol delivery device 900. In the particular implementation depicted in FIGS. 11 and 12, the induction transmitter comprises a laminate that includes a foil material 1114 that surrounds a support member 1116 (a support cylinder as illustrated), and the induction receiver of the depicted embodiment comprises a plurality of receiver prongs 1118 that extend from a receiver base member 1120. In some implementations, the foil material may include an electrical trace printed thereon, such as, for example, one or more electrical traces that may, in some implementations, form a helical pattern when the foil material is positioned around the induction receiver. In various implementations, the induction receiver and the induction transmitter may be constructed of one or more conductive materials, and in further implementations the induction receiver may be constructed of a ferromagnetic material including, but not limited to, cobalt, iron, nickel, and combinations thereof. In the illustrated implementation, the foil material is constructed of a conductive material and the receiver prongs are constructed of a ferromagnetic material. In various implementations, the receiver base member may be constructed of a non-conductive and/or insulating material.

As illustrated, the induction transmitter (foil material 1114) may extend proximate an engagement end of the housing 1102, and may be configured to substantially surround the portion of the heated end 1002 of the aerosol source member 904 that includes the aerosol precursor composition 1006. In such a manner, the induction transmitter of the illustrated implementation may define a tubular configuration. As illustrated in FIGS. 11 and 12, the induction transmitter may surround the support member 1116. The support cylinder may also define a tubular configuration, and may be configured to support the foil material such that the foil material does not move into contact with, and thereby short-circuit with, the induction receiver prongs 1118. In such a manner, the support cylinder may comprise a non-conductive material, which may be substantially transparent to an oscillating magnetic field produced by the foil material. In various implementations, the foil material may be imbedded in, or otherwise coupled to, the support cylinder. In the illustrated implementation, the foil material is engaged with an outer surface of the support cylinder; however, in other implementations, the foil material may be positioned at an inner surface of the support cylinder or be fully imbedded in the support cylinder.

In the illustrated implementation, the support cylinder 1116 may also serve to facilitate proper positioning of the aerosol source member 904 when the aerosol source member is inserted into the housing 1102. In particular, the support cylinder may extend from the opening 1104 of the housing to the receiver base member 1120. In the illustrated implementation, an inner diameter of the support cylinder may be slightly larger than or approximately equal to an outer diameter of a corresponding aerosol source member (e.g., to create a sliding fit) such that the support cylinder guides the aerosol source member into the proper position (e.g., lateral position) with respect to the control body 902. In the illustrated implementation, the control body is configured such that when the aerosol source member is inserted into the control body, the receiver prongs 1118 are located in the approximate radial center of the heated end 1002 of the aerosol source member. In such a manner, when used in conjunction with an extruded aerosol precursor composition that defines a tube structure, the receiver prongs are located inside of a cavity defined by an inner surface of the extruded tube structure, and thus do not contact the inner surface of the extruded tube structure.

In various implementations, the transmitter support member 1116 may engage an internal surface of the housing 1102 to provide for alignment of the support member with respect to the housing. Thereby, as a result of the fixed coupling between the support member and the induction transmitter, (foil material 1114) a longitudinal axis of the induction transmitter may extend substantially parallel to a longitudinal axis of the housing. In various implementations, the induction transmitter may be positioned out of contact with the housing, so as to avoid transmitting current from the transmitter coupling device to the outer body. In some implementations, an insulator may be positioned between the induction transmitter and the housing, so as to prevent contact therebetween. As may be understood, the insulator and the support member may comprise any nonconductive material such as an insulating polymer (e.g., plastic or cellulose), glass, rubber, ceramic, and porcelain. Alternatively, the induction transmitter may contact the housing in implementations in which the housing is formed from a nonconductive material such as a plastic, glass, rubber, ceramic, or porcelain.

Figure 13:
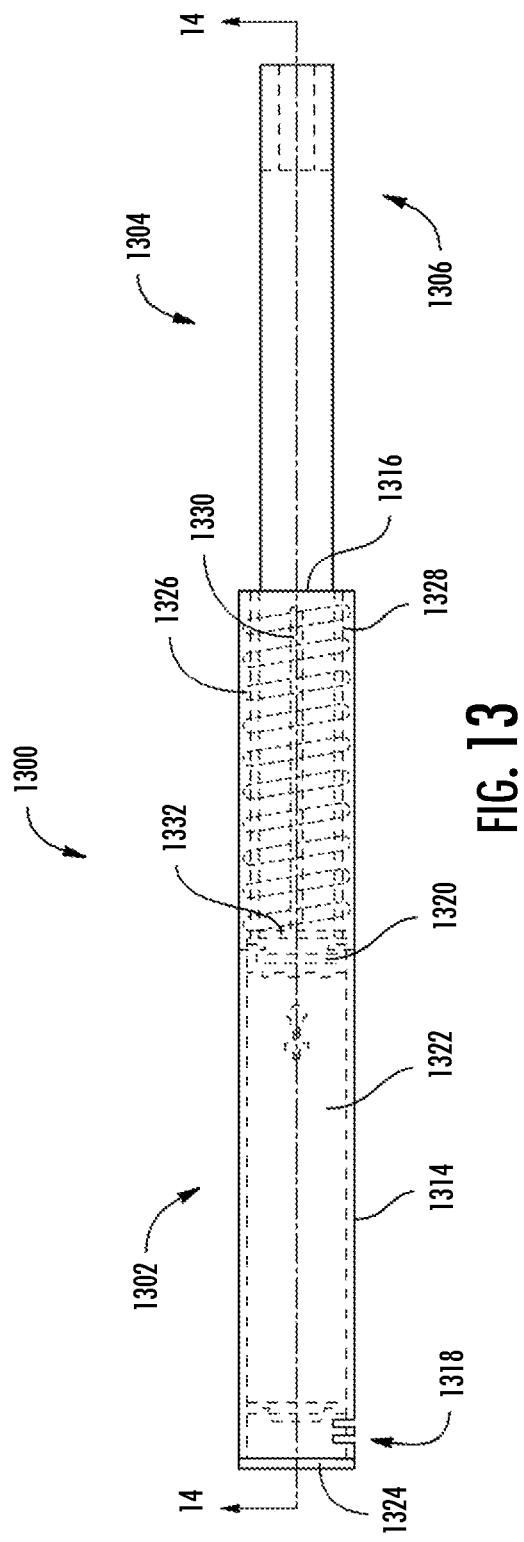
FIGS. 13 and 14 illustrate respectively a front view of and a sectional view through an aerosol delivery device according to another example implementation.
Figure 14:
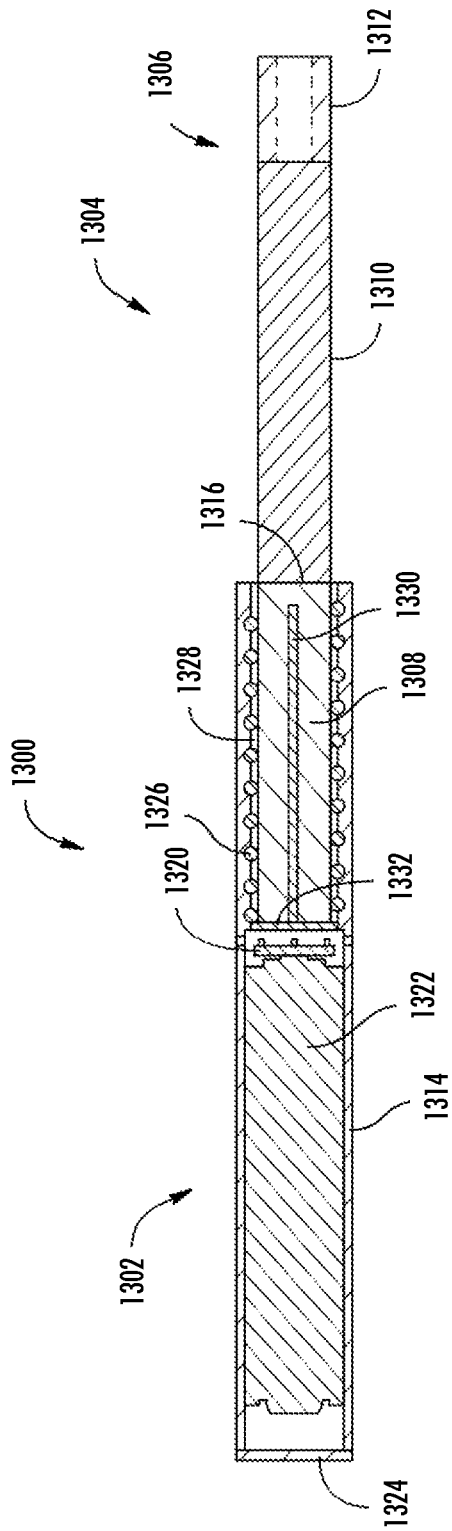

An alternate implementation is illustrated in FIGS. 13 and 14. Similar to the implementation described with respect to FIGS. 11 and 12, the implementation depicted in FIGS. 13 and 14 includes an aerosol delivery device 1300 comprising a control body 1302 that is configured to receive an aerosol source member 1304. As noted above, the aerosol source member may comprise a heated end, which is configured to be inserted into the control body, and a mouth end 1306, upon which a user draws to create the aerosol. At least a portion of the heated end may include an aerosol precursor composition 1308, which may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various implementations, the aerosol source member, or a portion thereof, may be wrapped in an overwrap material 1310, which may be formed of any material useful for providing additional structure and/or support for the aerosol source member. In various implementations, the overwrap material may comprise a material that resists transfer of heat, which may include a paper or other fibrous material, such as a cellulose material. Various configurations of possible overwrap materials are described with respect to the example implementation of FIGS. 3 and 4 above.

In various implementations, the mouth end 1306 of the aerosol source member 1304 may include a filter 1312, which may be made of a cellulose acetate or polypropylene material. As noted above, in various implementations, the filter may increase the structural integrity of the mouth end of the aerosol source member, and/or provide filtering capacity, if desired, and/or provide resistance to draw. In some embodiments, the filter may be separate from the overwrap, and the filter may be held in position near the cartridge by the overwrap. Various configurations of possible filter characteristics are described with respect to the example implementation of FIGS. 3 and 4 above.

The control body 1302 may comprise a housing 1314 that includes an opening 1316 defined therein, a flow sensor 1318 (e.g., a puff sensor or pressure switch), a control component 1320 (e.g., a microprocessor, individually or as part of a microcontroller, a PCB that includes a microprocessor and/or microcontroller, etc.), a power source 1322 (e.g., a battery, which may be rechargeable, and/or a rechargeable supercapacitor), and an end cap that includes an indicator 1324 (e.g., a LED). As noted above, in one implementation, the indicator may comprise one or more LEDs, quantum dot-based LEDs or the like. The indicator can be in communication with the control component and be illuminated, for example, when a user draws on the aerosol source member 1304, when coupled to the control body, as detected by the flow sensor. Examples of power sources, sensors, and various other possible electrical components are described above with respect to the example implementation of FIGS. 11 and 12 above.

The control body 1302 of the implementation depicted in FIGS. 13 and 14 includes an induction transmitter and an induction receiver that together form the transformer. The transformer of various implementations of the present disclosure may take a variety of forms, including implementations where one or both of the induction transmitter and induction receiver are located in the control body and/or the aerosol delivery device. In the particular implementation depicted in FIGS. 13 and 14, the induction transmitter of the depicted implementation comprises a helical coil 1326 that surrounds a support member 1328 (a support cylinder as illustrated). In various implementations, the induction receiver and the induction transmitter may be constructed of one or more conductive materials, and in further implementations the induction receiver may be constructed of a ferromagnetic material including, but not limited to, cobalt, iron, nickel, and combinations thereof. In the illustrated implementation, the helical coil is constructed of a conductive material. In further implementations, the helical coil may include a non-conductive insulating cover/wrap material.

The induction receiver of the illustrated implementation comprises a single receiver prong 1330 that extends from a receiver base member 1332. In various implementations a receiver prong, whether a single receiver prong, or part of a plurality of receiver prongs, may have a variety of different geometric configurations. For example, in some implementations the receiver prong may have a cylindrical cross-section, which, in some implementations may comprise a solid structure, and in other implementations, may comprise a hollow structure. In other implementations, the receiver prong may have a square or rectangular cross-section, which, in some implementations, may comprise a solid structure, and in other implementations, may comprise a hollow structure. In various implementations, the receiver prong may be constructed of a conductive material. In the illustrated implementation, the receiver prong is constructed of a ferromagnetic material including, but not limited to, cobalt, iron, nickel, and combinations thereof. In various implementations, the receiver base member may be constructed of a non-conductive and/or insulating material.

As illustrated, the induction transmitter (helical coil 1326) may extend proximate an engagement end of the housing 1314, and may be configured to substantially surround the portion of the heated end of the aerosol source member 1304 that includes the aerosol precursor composition 1310. As illustrated in FIGS. 13 and 14, the induction transmitter may surround the support member 1328. The support cylinder, which may define a tubular configuration, may be configured to support the helical coil such that the coil does not move into contact with, and thereby short-circuit with, the induction receiver prong 1330. In such a manner, the support cylinder may comprise a nonconductive material, which may be substantially transparent to an oscillating magnetic field produced by the helical coil. In various implementations, the helical coil may be imbedded in, or otherwise coupled to, the support cylinder. In the illustrated implementation, the helical coil is engaged with an outer surface of the support cylinder; however, in other implementations, the helical coil may be positioned at an inner surface of the support cylinder or be fully imbedded in the support cylinder.

In the illustrated implementation, the support cylinder 1328 may also serve to facilitate proper positioning of the aerosol source member 1304 when the aerosol source member is inserted into the housing 1314. In particular, the support cylinder may extend from the opening 1319 of the housing to the receiver base member 1332. In the illustrated implementation, an inner diameter of the transmitter source cylinder may be slightly larger than or approximately equal to an outer diameter of a corresponding aerosol source member (e.g., to create a sliding fit) such that the support cylinder guides the aerosol source member into the proper position (e.g., lateral position) with respect to the control body 1302. In the illustrated implementation, the control body is configured such that when the aerosol source member is inserted into the control body, the receiver prong 1330 is located in the approximate radial center of the heated end of the aerosol source member. In such a manner, when used in conjunction with an extruded aerosol precursor composition that defines a tube structure, the receiver prong is located inside of a cavity defined by an inner surface of the extruded tube structure, and thus does not contact the inner surface of the extruded tube structure.

It should be noted that in some implementations, the induction receiver may be a part of an aerosol source member, such as for example, as a part of the aerosol precursor composition of an aerosol source member. Such implementations may or may not include an additional induction receiver that is part of the control body. For example, the aerosol precursor composition may comprises a braided wire structure embedded into an extruded tube. The braided wire structure may comprise a series of interwoven cross wires that may be constructed of any one or more conductive materials, and further may be constructed of one or more ferromagnetic materials including, but not limited to, cobalt, iron, nickel, and combinations thereof. In various implementations the braided wire structure may be proximate an inner surface or outer surface of the aerosol precursor composition, or may be located within the extruded tube structure.

In various implementations, the transmitter support cylinder may engage an internal surface of the housing to provide for alignment of the support cylinder with respect to the housing. Thereby, as a result of the fixed coupling between the support cylinder and the induction transmitter, a longitudinal axis of the induction transmitter may extend substantially parallel to a longitudinal axis of the housing. In various implementations, the induction transmitter may be positioned out of contact with the housing, so as to avoid transmitting current from the transmitter coupling device to the outer body. In some implementations, an insulator may be positioned between the induction transmitter and the housing, so as to prevent contact therebetween. As may be understood, the insulator and the support cylinder may comprise any nonconductive material such as an insulating polymer (e.g., plastic or cellulose), glass, rubber, ceramic, and porcelain. Alternatively, the induction transmitter may contact the housing in implementations in which the housing is formed from a nonconductive material such as a plastic, glass, rubber, ceramic, or porcelain.

Figure 15:
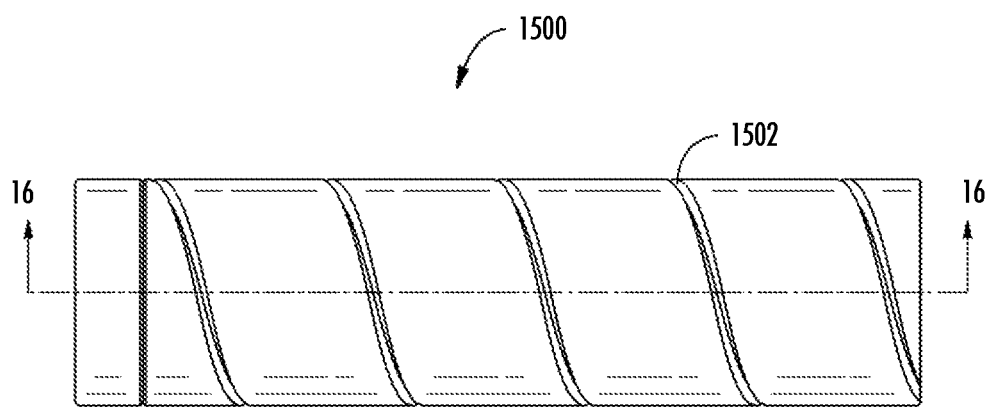
FIGS. 15 and 16 illustrate respectively a front view of and a sectional view through a support cylinder according to an example implementation.
Figure 16:
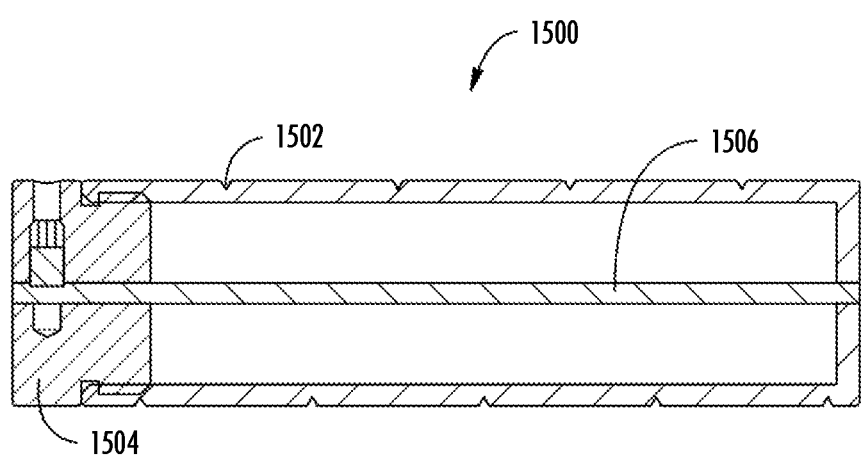

Although in some implementations, the support cylinder and the receiver base member may comprise separate components, in other implementations, the support cylinder and the receiver base member may be integral components. For example, FIG. 15 illustrates a front view of a support member 1500 according to an example implementation of the present disclosure. FIG. 16 illustrates a sectional view through the support cylinder 1500 of FIG. 15. As depicted in the figures, the support cylinder comprises a tube configuration configured to support a induction transmitter, such as, for example, a helical coil. In such a manner, an outer surface of the support cylinder may include one or more coil grooves 1502 that may be configured to guide, contain, or otherwise support an induction transmitter such as a transmitter coil. As depicted in FIG. 16, the support cylinder may integrate with a receiver base member 1504, which may be attached at one end of the support cylinder. Further, in various implementations an induction receiver, such as in the case of the illustrated implementation, a single receiver prong 1506 may be contained by and extend from the receiver base member. In various implementations, the support cylinder and induction receiver (in the illustrated implementation, the receiver prong) may be constructed of different materials so as to avoid creating a short-circuit with the induction transmitter. In particular, the support cylinder may comprise a nonconductive material such as an insulating polymer (e.g., plastic or cellulose), glass, rubber, ceramic, porcelain, and combinations thereof, while the induction receiver (in the illustrated implementation, the receiver prong) may comprise a conductive material. In various implementations, the induction receiver (in the depicted implementation the receiver prong) may be constructed of a ferromagnetic material including, but not limited to, cobalt, iron, nickel, and combinations thereof.

In the illustrated implementation, the support cylinder is configured such that an induction transmitter, such as a helical coil, may engage with an outer surface of the support cylinder; however, in other implementations, the support cylinder may be configured such that an induction transmitter may be positioned at an inner surface of the transmitter support cylinder or fully imbedded in the support cylinder.

Other implementations of the aerosol delivery device, control body and aerosol source member are described in U.S. patent application Ser. No. 15/799,365 to Sebastian et al., filed Oct. 31, 2017, which is incorporated herein by reference.

Figure 17:
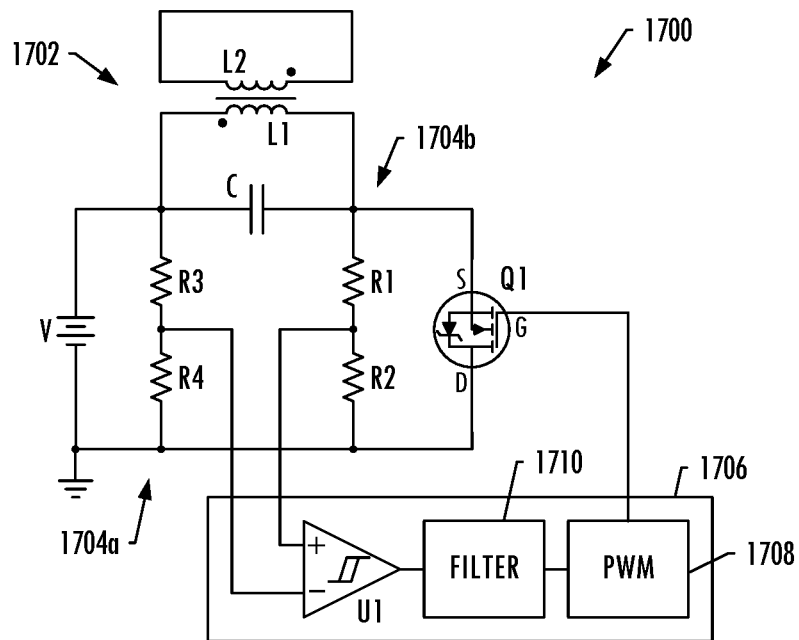
FIGS. 17 and 18 illustrate a quasi-resonant flyback converter according to some example implementations.

In some examples of either an electronic cigarette or heat-not-burn device, the transformer including the induction transmitter and induction receiver may be part of a quasi-resonant flyback converter. In this regard, FIG. 17 illustrates a quasi-resonant flyback converter 1700 according to some example implementations. As shown, the quasi-resonant flyback converter includes a transformer 1702 including an induction transmitter (shown as inductor L1) and an induction receiver (shown as inductor L2). The induction transmitter may correspond to the induction transmitter of any of the above example implementations, including induction transmitter 302, foil 1114 or helical coil 1326. Similarly, the induction receiver may correspond to the induction receiver of any of the above example implementations, including induction receiver 602, receiver prongs 1118 or receiver prong 1330.

As also shown, the quasi-resonant flyback converter 1700 includes a capacitor C (or parallel capacitors) that with the induction transmitter L1 forms a tank circuit. The quasi-resonant flyback converter also includes a transistor Q1, such as a metal-oxide-semiconductor field-effect transistor (MOSFET). The transistor is switchable in cycles to cause the induction transmitter to generate an oscillating magnetic field and induce an alternating voltage in the induction receiver L2 when exposed to the oscillating magnetic field. This alternating voltage causes the induction receiver to generate heat and thereby vaporize components of the aerosol precursor composition of the aerosol delivery device (e.g., device 100, 900, 1300).

According to example implementations, each of the cycles includes an on-interval and an off-interval. In the on-interval, the transistor Q1 is switched on to enable current through the induction transmitter L1 that causes the induction transmitter to generate a magnetic field in which the induction transmitter stores energy. In the off-interval, the transistor is switched off to disable current through the induction transmitter that causes a collapse of the magnetic field. This the collapse of the magnetic field causes a transfer of the energy from the induction transmitter to the induction receiver L2, and charges the capacitor C and thereby causes a voltage waveform at a drain D of the transistor (the transistor also including a source S and a gate G).

The quasi-resonant flyback converter 1700 also includes a comparator U1 with two input terminals +,− coupled to either side of the capacitor C between the capacitor and the drain D of the transistor. In some examples, as also shown, the quasi-resonant flyback converter 1700 further includes first and second voltage dividers 1704a, 1704b whose inputs are coupled to either side of the capacitor C. In these examples, the two input terminals +,− of the comparator U1 are coupled to outputs of respective ones of the first and second voltage dividers and thereby coupled to either side of the capacitor. The comparator is configured to detect a trough in the voltage waveform during the off-interval in which the transistor is switched off. And in response, the comparator is configured to produce an output to cause the transistor to switch on for the on-interval.

Figure 18:
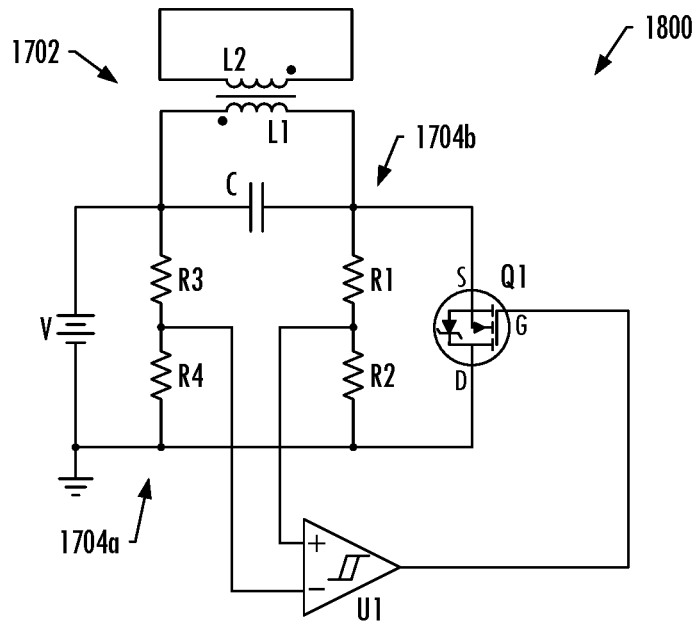

In some examples, the comparator U1 is implemented by a coprocessor 1706 such as a programmable system-on-chip (PSoC), suitable examples of which include the CY8C4Axx family of PSOC® analog coprocessors from Cypress Semiconductor. In other examples, the comparator U1 is implemented by an individual electronic component or a circuit constructed of discrete electronic components. This is shown in FIG. 18 for a quasi-resonant flyback converter 1800 that is otherwise similar to the quasi-resonant flyback converter 1700 in FIG. 17.

Returning to FIG. 17, in examples including a coprocessor 1706, the coprocessor may also be configured to implement a pulse-width modulation (PWM) controller 1708 and/or a glitch filter 1710. The PWM controller is configured to receive the output from the comparator U1, and in response drive the transistor Q1 to switch on for the on-interval. The glitch filter, which may be coupled to and between the comparator and PWM controller, is configured to receive and remove glitch pulses from the output of the comparator and thereby produce a filtered output. In examples also including both the PWM controller and glitch filter, the PWM controller may configured to receive the filtered output, and in response drive the transistor to switch on for the on-interval.

In some examples, the transistor Q1 has a drain-to-source on-state resistance ($R_{DS(on)}$) that is inversely proportional to a switching time of the transistor. In these examples, the on-state resistance is also directly proportional to a time in which the alternating voltage is induced in the induction receiver L2 and thereby the heat is generated.

In some examples, the aerosol delivery device 100, 900, 1300 further includes a power source V such as power source 312, 1110, 1322. In these examples, the power source is connected to an electrical load that includes the transformer 1702, and configured to supply a current to the load. The amount of the heat the induction receiver L2 is caused to generate is directly proportional to an intensity of the current supplied by the power source. In some further examples, the power source includes a rechargeable primary battery and a rechargeable secondary battery in a parallel combination.

In some examples, the induction receiver L2 includes a coil. In these examples, an amount of the heat the induction receiver is caused to generate is directly proportional to a length of the coil.

Many modifications and other implementations of the disclosure will come to mind to one skilled in the art to which this disclosure pertains having the benefit of the teachings presented in the foregoing descriptions and the associated drawings. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. A cartridge for an aerosol delivery device, the cartridge comprising:
   a housing;
   an induction receiver coupled to the housing; and
   a substrate comprising an aerosol precursor composition and configured to be at least partially received within the housing and the induction receiver.

2. The cartridge of claim 1, wherein the housing comprises an engagement mechanism disposed at one end thereof, the engagement mechanism configured to couple the cartridge to a control body comprising a power source and an induction transmitter.

3. The cartridge of claim 2, wherein the engagement mechanism comprises at least one of a threaded engagement, a press-fit engagement, an interference fit, a sliding fit, or a magnetic engagement.

4. The cartridge of claim 2, wherein the induction receiver is configured to be at least partially received within an internal chamber of the induction transmitter when the control body and the cartridge are in a coupled configuration so as to generate heat and thereby vaporize components of the aerosol precursor composition.

5. The cartridge of claim 1, further comprising a mouthpiece disposed at one end of the housing.

6. The cartridge of claim 1, wherein the housing comprises a reservoir configured to receive the aerosol precursor composition therein.

7. The cartridge of claim 6, wherein the substrate further comprises a liquid transport element configured to receive the aerosol precursor composition from the reservoir and transport the aerosol precursor composition along a length of the substrate to an area about which the induction receiver extends.

8. The cartridge of claim 1, wherein the aerosol precursor composition includes a solid tobacco material, a semi-solid tobacco material or a liquid aerosol precursor composition.

9. The cartridge of claim 1, wherein the substrate comprises at least one of a porous ceramic, carbon, cellulose acetate, polyethylene terephthalate, fiberglass, or porous sintered glass.

10. An aerosol delivery device comprising:
    the cartridge of claim 1; and
    a control body comprising:
       a housing defining an opening and configured to at least partially receive the cartridge, and within the housing,
       a power source; and
       an induction transmitter that with the induction receiver forms an induction transformer in communication with the power source, wherein the induction transmitter defines an internal chamber configured to at least partially receive the induction receiver therein when the cartridge is coupled to the control body, the induction receiver configured to generate heat and thereby vaporize components of the aerosol precursor composition.

11. The aerosol delivery device of claim 10 further comprising a control component configured to direct current from the power source to the induction transmitter.

12. The aerosol delivery device of claim 11 further comprising a flow sensor, wherein the control component is configured to direct current from the power source to the induction transmitter when a draw on the aerosol delivery device is detected by the flow sensor.

13. The aerosol delivery device of claim 10 further comprising an insulator disposed between the induction transmitter and the control body housing.

14. The aerosol delivery device of claim 10 further comprising a support disposed within the induction transmitter and further defining the internal chamber.

15. The aerosol delivery device of claim 14, wherein the support comprises a tubular structure about which the induction transmitter is coiled.

16. The aerosol delivery device of claim 10, wherein the control body further comprises:
   a quasi-resonant flyback converter comprising:
      a capacitor that with the induction transmitter forms a tank circuit; and
      a transistor that is switchable in cycles to cause the induction transmitter to generate an oscillating magnetic field and induce an alternating voltage in the induction receiver when exposed to the oscillating magnetic field, the alternating voltage causing the induction receiver to generate heat and, when the induction receiver is at least partially received within the internal chamber of the induction transmitter, vaporize components of the aerosol precursor composition to produce an aerosol,
   wherein each of the cycles includes an on-interval and an off-interval, and the quasi-resonant flyback converter further comprises a comparator with two input terminals coupled to either side of the capacitor between the capacitor and a drain of the transistor, the comparator being configured to detect a trough in a voltage waveform at the drain of the transistor during the off-interval in which the transistor is switched off, and in response produce an output to cause the transistor to switch on for the on-interval.

* * * * *